(12) United States Patent
Bassis et al.

(10) Patent No.: US 10,436,306 B2
(45) Date of Patent: Oct. 8, 2019

(54) METHODS AND SYSTEMS FOR NOISE MITIGATION IN MULTIPLE MOTOR GEARBOX DRIVE UNITS

(71) Applicant: NIO USA, Inc., San Jose, CA (US)

(72) Inventors: Dimitri Bassis, Menlo Park, CA (US); Brittany M. Repac, Pleasanton, CA (US)

(73) Assignee: NIO USA, Inc., San Jose, CA (US)

( * ) Notice: Subject to any disclaimer, the term of this patent is extended or adjusted under 35 U.S.C. 154(b) by 44 days.

(21) Appl. No.: 15/842,362

(22) Filed: Dec. 14, 2017

(65) Prior Publication Data

US 2019/0186616 A1    Jun. 20, 2019

(51) Int. Cl.
*F16H 57/028*    (2012.01)
*F16H 57/02*    (2012.01)
(Continued)

(52) U.S. Cl.
CPC . F16H 57/028 (2013.01); *F16H 2057/02043* (2013.01)

(58) Field of Classification Search
CPC ...... H02P 1/00; H02P 1/04; H02P 1/46; H02P 1/465; H02P 3/00; H02P 6/00; H02P 5/69; H02P 5/695; H02P 5/753; H02P 6/005; H02P 6/008; H02P 6/10; H02P 6/16; H02P 21/00; H02P 23/00; H02P 25/027; H02P 2007/052; F16H 15/00; F16H 15/56;
(Continued)

(56) References Cited

U.S. PATENT DOCUMENTS 638,643 A    12/1899 Newman et al.
1,251,749 A    1/1918 Cilley
(Continued)

FOREIGN PATENT DOCUMENTS

CN    103237673    8/2013
CN    103786568    5/2014
(Continued)

OTHER PUBLICATIONS

"Gasoline Turbocharger," BorgWarner Inc., 2016, retrieved from https://www.borgwarner.com/docs/default-source/investors/investor-events-presentations/bw_investorday_kiosks.pdf?sfvrsn=9, retrieved on Apr. 12, 2018, 40 pages.
(Continued)

*Primary Examiner* — Antony M Paul
(74) *Attorney, Agent, or Firm* — Sheridan Ross P.C.

(57) ABSTRACT

Methods and systems for controlling noise in multiple motor gearbox drive units having a common housing are provided. The disclosure describes adjusting an angular position of a drive element of a first motor drive unit relative to the angular position of a drive element of a second motor drive unit in a multiple motor gearbox drive unit. This adjustment to the relative angular position of the drive elements shifts the phase angle of noise sound waves generated by the first and second motor drive units in the multiple motor gearbox drive unit. In some cases, the phase angle shift causes a noise sound wave generated by the first motor drive unit to cancel a noise sound wave generated by the second motor drive unit thereby reducing the overall noise emitted from the common housing of the multiple motor gearbox drive unit while operating.

20 Claims, 16 Drawing Sheets

(51) Int. Cl.
*H02P 17/00* (2006.01)
*H02P 6/10* (2006.01)
*B60L 15/02* (2006.01)
*F16H 15/00* (2006.01)
*F16H 15/56* (2006.01)

(58) Field of Classification Search
CPC ..... B60L 15/02; B60L 11/1803; H02K 33/10; H02K 19/12; B60K 17/00
USPC ......... 475/84, 162, 165, 198, 210, 214, 220; 73/1.46, 1.48, 443, 769; 180/167, 69.22, 180/337; 200/61.01; 318/128, 460, 700, 318/705, 400.23, 400.24, 400.25; 702/39
See application file for complete search history.

(56) References Cited

U.S. PATENT DOCUMENTS

| | | | |
|---|---|---|---|
| 1,728,889 | A | 9/1929 | Kemble |
| 5,743,347 | A | 4/1998 | Gingerich |
| 5,829,542 | A | 11/1998 | Lutz |
| 5,927,417 | A | 7/1999 | Brunner et al. |
| 6,089,341 | A | 7/2000 | Gingerich |
| 6,276,474 | B1 | 8/2001 | Ruppert et al. |
| 6,727,620 | B2 | 4/2004 | White et al. |
| 7,028,583 | B2 | 4/2006 | Bennett |
| 7,112,155 | B2 | 9/2006 | Keuth |
| 7,276,005 | B2 | 10/2007 | Morikawa |
| 7,350,606 | B2 | 4/2008 | Brill et al. |
| 7,530,420 | B2 | 5/2009 | Davis et al. |
| 7,627,503 | B1 | 12/2009 | Champagne et al. |
| 7,854,674 | B2 | 12/2010 | Freudenreich |
| 7,935,014 | B2 | 5/2011 | Bachmann |
| 8,091,677 | B2 | 1/2012 | Murty |
| 8,561,732 | B2 | 10/2013 | Schoon |
| 8,640,800 | B2 | 2/2014 | Ambruster et al. |
| 8,640,801 | B2 | 2/2014 | Hennings et al. |
| 8,727,923 | B2 | 5/2014 | Huelsemann |
| 9,168,818 | B2 | 10/2015 | Hirai et al. |
| 9,487,163 | B2 | 11/2016 | Matano et al. |
| 9,566,851 | B2 | 2/2017 | Kawamura et al. |
| 9,724,990 | B2 | 8/2017 | Hoermandinger et al. |
| 9,821,650 | B2 | 11/2017 | Falls et al. |
| 9,845,123 | B2 | 12/2017 | Byrnes et al. |
| 10,052,969 | B2 * | 8/2018 | Valeri ................... B60Q 5/008 |
| 2005/0092533 | A1 | 5/2005 | Ishii |
| 2005/0211490 | A1 | 9/2005 | Shimizu et al. |
| 2006/0225930 | A1 | 10/2006 | Schulte |
| 2009/0014223 | A1 | 1/2009 | Jones et al. |
| 2010/0108417 | A1 | 5/2010 | Gilmore |
| 2011/0094807 | A1 | 4/2011 | Pruitt |
| 2011/0162899 | A1 | 7/2011 | Blade |
| 2011/0192662 | A1 | 8/2011 | Hennings et al. |
| 2011/0259657 | A1 | 10/2011 | Fuechtner |
| 2012/0052995 | A1 | 3/2012 | Scrabo et al. |
| 2012/0058853 | A1 | 3/2012 | Schoon et al. |
| 2017/0130625 | A1 * | 5/2017 | Jung ....................... F01N 9/00 |
| 2018/0250982 | A1 | 9/2018 | Albl et al. |
| 2018/0345777 | A1 | 12/2018 | Birnschein et al. |

FOREIGN PATENT DOCUMENTS

| | | |
|---|---|---|
| CN | 104967250 | 10/2015 |
| CN | 205632080 U | 10/2016 |
| WO | WO 2007/118082 | 10/2007 |
| WO | WO 2009/017533 | 2/2009 |
| WO | WO 2017/211793 | 12/2017 |

OTHER PUBLICATIONS

"I-Pace Concept," Jaguar, brochure, 2016, 23 pages.
U.S. Appl. No. 15/690,069, filed Aug. 29, 2017, Bassis.
U.S. Appl. No. 15/841,080, filed Dec. 13, 2017, Bassis.
Kane, "Rimac Automobili Enters Electric Vehicle Powertrain Market With True Authority; Will Sell All of Its Highly Specialized Components," INSIDEEVs, 2013, retrieved from https://insideevs.com/rimac-automobili-to-enter-electric-vehicle-powertrain-market-with-true-authority/, retrieved on Apr. 12, 2018, 3 pages.
Official Action for U.S. Appl. No. 15/690,069, dated Apr. 2, 2018, 12 pages.
Official Action for U.S. Appl. No. 15/690,069, dated Jan. 29, 2019, 13 pages.
Final Action for U.S. Appl. No. 15/690,069, dated Oct. 9, 2018, 11 pages.
Notice of Allowance for U.S. Appl. No. 15/690,069, dated Jul. 29, 2019, 8 pages.
Official Action for U.S. Appl. No. 15/841,080, dated Aug. 2, 2019, 21 pages.

* cited by examiner

METHODS AND SYSTEMS FOR NOISE MITIGATION IN MULTIPLE MOTOR GEARBOX DRIVE UNITS

FIELD

The present disclosure is generally directed to vehicle transmission systems, in particular, toward electric and/or hybrid-electric vehicle motor gearbox drive units.

BACKGROUND

Vehicle transmissions are designed to control the application of power output from an engine. Conventional transmissions generally include a gearbox comprising one or more gears that can be selectively engaged with a power input shaft at a number of gear ratios. The crankshaft, or other rotating member or coupling, of an engine may serve as the power input shaft to the transmission. The transmission and gearbox can provide an output speed, torque, power, or other mechanical characteristic that is different from, or the same as, that provided by the power input shaft of the engine. The power output from the transmission is provided, in some form, to the drive wheel, or wheels, of a vehicle.

Most internal combustion engines rely on the transmission to provide optimal torque and vehicle speeds over a range of operating conditions. In contrast, electric vehicles, employing one or more electric motors, have a wide torque band capable of providing maximum torque output at low or high revolutions per minute (rpm). In some cases, an electric vehicle may include a gearbox configured with a planetary gear reduction. This type of gearbox may be designed to match the rpm of the electric motor to that of the drive wheels.

In any event, transmissions can be large, heavy, noisy, and generally require specific mounting interfaces that can dictate the design and/or limit the configuration of a vehicle.

DETAILED DESCRIPTION

Embodiments of the present disclosure will be described in connection with a vehicle, and in some embodiments, an electric vehicle, rechargeable electric vehicle, and/or hybrid-electric vehicle and associated systems.

Figure 1:
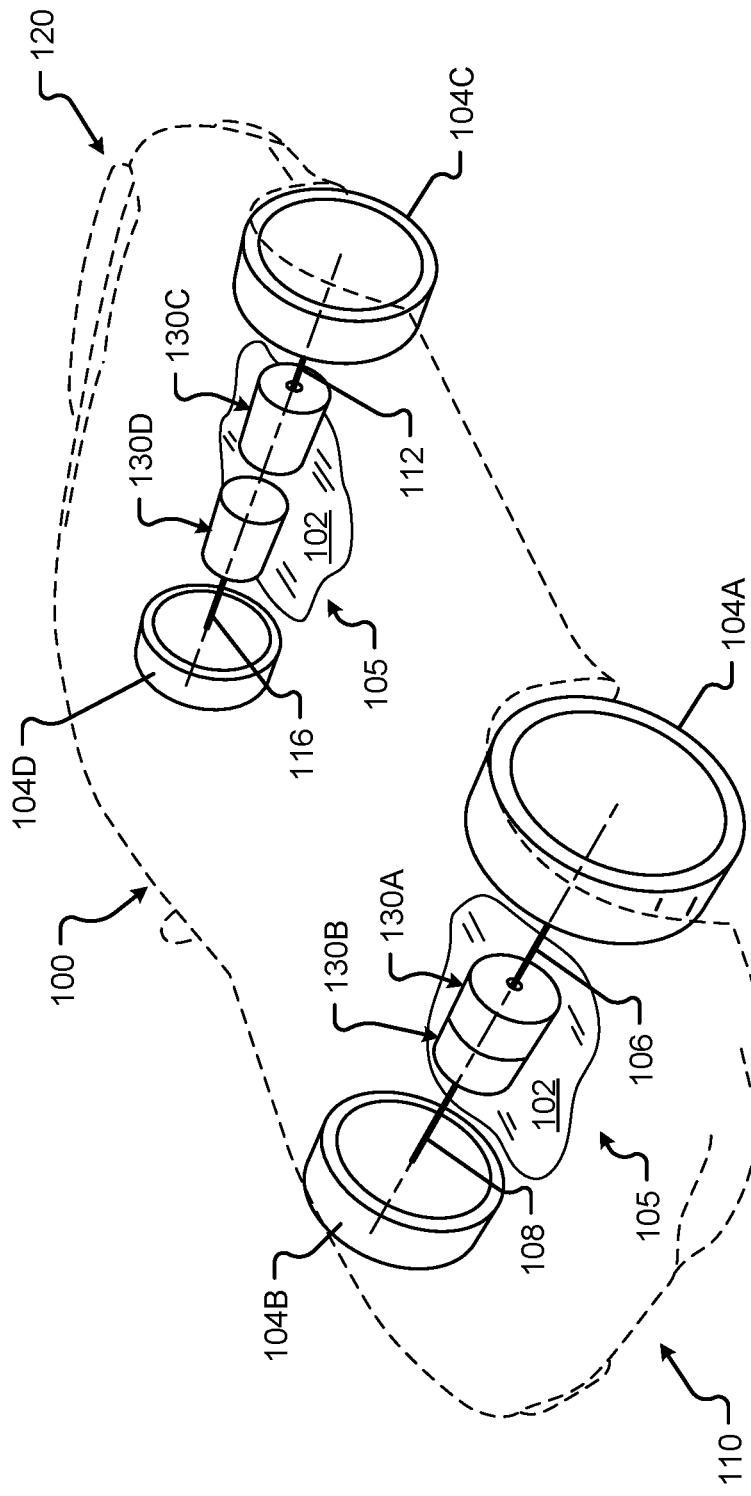
FIG. 1 shows a schematic perspective view of a vehicle powertrain in accordance with embodiments of the present disclosure.

FIG. 1 shows a perspective view of a vehicle powertrain 105 in accordance with embodiments of the present disclosure. The vehicle powertrain 105 may be part of an electric vehicle 100. The vehicle 100 may comprise a vehicle frame 102, vehicle front 110, vehicle aft, or rear, 120, vehicle roof, at least one vehicle side, a vehicle undercarriage, and a vehicle interior. In some embodiments, the frame 102 may include one or more body panels mounted or affixed thereto. The frame 102 may be a portion of the vehicle chassis, structure, support, and/or some other rigid mount member of a vehicle 100. The vehicle 100 may include one or more interior components (e.g., components inside an interior space, or user space, of a vehicle 100, etc.), exterior components (e.g., components outside of the interior space, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

The powertrain 105 may include one or more motor gearbox units 130A-D. The motor gearbox units 130A-D may be configured to provide power to one or more wheels 104A-D of the vehicle 100 via at least one drive axle 106, 108, 112, 116. The motor gearbox units 130A-D may include an electric motor that is mechanically coupled with a gearbox. In some embodiments, the motor gearbox units 130A-D may include an inverter. The inverter may be configured to convert direct current (DC) electricity provided from a battery, or other DC power source, into alternating current (AC) electricity that may drive the electric motor of the motor gearbox unit 130A-D.

As shown in FIG. 1, the vehicle 100 may include at least one powertrain 105 located in various positions in the vehicle 100. For instance, the vehicle 100 may include a front drive system, a rear drive system, and/or both a front and rear drive system. In some embodiments, each drive wheel 104A-D may be powered by a separate motor gearbox unit 130A-D. In one embodiment, a single motor gearbox unit 130A-D may provide power to more than drive wheel 104A-D.

In the event that multiple motor gearbox drive units 130A-D are employed to provide power to the drive wheels 104A-D along the same drive axis, the motor gearbox units 130A-D may share a common, or unified, housing and interconnection to the vehicle frame 102. This unified housing configuration is schematically illustrated in the first and second motor gearbox units 130A, 130B driving first and second drive wheels 104A, 104B, via drive axles 106, 108, respectively. In some embodiments, separate and/or spaced apart multiple motor gearbox drive units 130C, 130D, having individual or separate housings, may be employed to provide power to the drive wheels 104C, 104D along the same drive axis. In this example, the third and fourth motor gearbox units 130A, 130B may drive third and fourth drive wheels 104C, 104D, via drive axles 112, 116, respectively.

In some embodiments, the motor gearbox unit 130A-D may be mounted to a portion of the vehicle 100 via one or more attachment points. For instance, the motor gearbox unit 130A-D may be interconnected with the vehicle chassis or frame 102 via a bolted connection, clamped connection, or other attachment. In one embodiment, the housing of the motor gearbox unit 130A-D may include one or more features configured to provide a removable connection to the frame 102 of the vehicle 100. These features can include, but are in no way limited to, one or more flanges, ledges, feet, pads, protrusions, bolt holes, apertures, studs, threaded holes, threaded rods, etc., and/or combinations thereof. In any event, the fixed interconnection of the motor gearbox unit 130A-D with the vehicle frame 102 can allow power to be efficiently transmitted from the motor through the gearbox and drive axles 108, 110, 112, 116 to one or more drive wheels 104A-D.

The frame 102 may comprise a separate frame and body construction (i.e., body-on-frame construction), a unitary frame and body construction (i.e., a unibody construction), or any other construction defining the structure of the vehicle 100. The frame 102 may be made from one or more materials including, but in no way limited to steel, titanium, aluminum, carbon fiber, plastic, polymers, etc., and/or combinations thereof. In some embodiments, the frame 102 may be formed, welded, fused, fastened, pressed, etc., combinations thereof, or otherwise shaped to define a physical structure and strength of the vehicle 100. In any event, the frame 102 may comprise one or more surfaces, connections, protrusions, cavities, mounting points, pads, tabs, slots, or other features that are configured to receive other components that make up the vehicle 100. For example, the body panels, powertrain, controls system, interior components, and/or safety elements may interconnect with, or attach to, the frame 102 of the vehicle 100.

In some embodiments, the frame 102 may include one or more modular system and/or subsystem connection mechanisms. These mechanisms may include features that are configured to provide a selectively interchangeable interface for one or more of the systems and/or subsystems described herein. The mechanisms may provide for a quick exchange, or swapping, of components while providing enhanced security and adaptability over conventional manufacturing or attachment. For instance, the ability to selectively interchange systems and/or subsystems in the vehicle 100 allow the vehicle 100 to adapt to the ever-changing technological demands of society and advances in safety. Among other things, the mechanisms may provide for the quick exchange of batteries, capacitors, power sources, motors, motor gearbox units 130A-D, safety equipment, controllers, user interfaces, interior and/or exterior components, body panels, bumpers, sensors, etc., and/or combinations thereof. Additionally or alternatively, the mechanisms may provide unique security hardware and/or software embedded therein that, among other things, can prevent fraudulent or low quality construction replacements from being used in the vehicle 100. Similarly, the mechanisms, subsystems, and/or receiving features in the vehicle 100 may employ pokayoke, or mistake-proofing, features that ensure a particular mechanism is always interconnected with the vehicle 100 in a correct position, function, etc.

By way of example, complete systems or subsystems may be removed and/or replaced from a vehicle 100 utilizing a single-minute exchange ("SME") principle. In some embodiments, the frame 102 may include slides, receptacles, cavities, protrusions, and/or a number of other features that allow for quick exchange of system components. In one embodiment, the frame 102 may include tray or ledge features, mechanical interconnection features, locking mechanisms, retaining mechanisms, etc., and/or combinations thereof.

Figure 2:
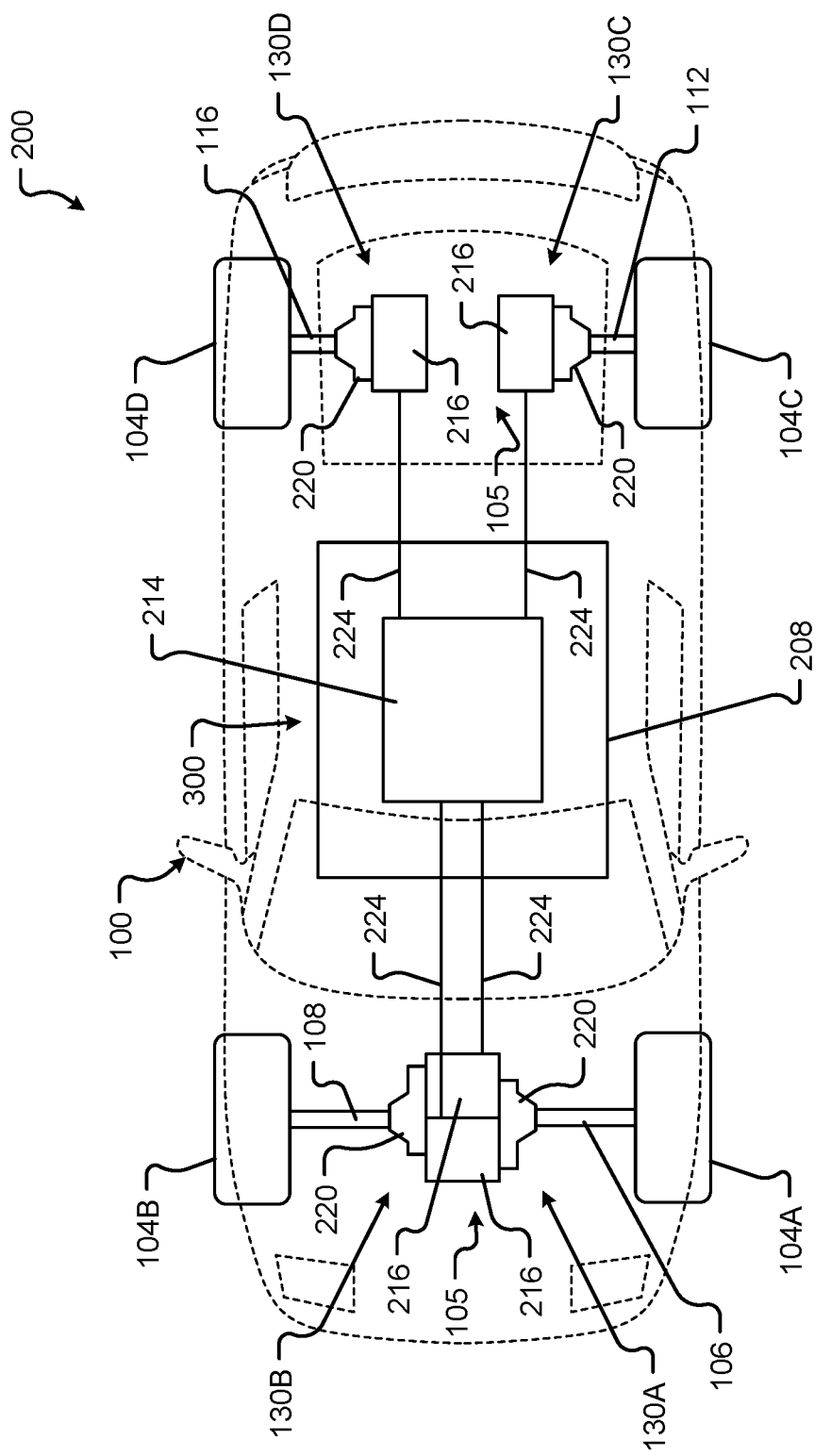
FIG. 2 shows a plan view of the vehicle powertrain in accordance with at least some embodiments of the present disclosure.

Referring now to FIG. 2, a plan view of the vehicle power system 200 will be described in accordance with embodiments of the present disclosure. The power system of the vehicle 100 may include the powertrain 105, power distribution system, accessory power system, and/or any other components that store power, provide power, convert power, and/or distribute power to one or more portions of the vehicle 100. The powertrain 105 may include the one or more electric motors 216 of the vehicle 100. The electric motors 216 are configured to convert electrical energy provided by a power source 208 into mechanical energy. This mechanical energy may be in the form of a rotational or other output force that is configured to propel or otherwise provide a motive force for the vehicle 100 via at least one drive axle 106, 108, 112, 116 interconnected to at least one drive wheel 104A-D.

In some embodiments, the vehicle 100 may include one or more drive wheels 104A-D that are driven by the one or more electric motors 216 via a gearbox 220 and drive axle 106, 108, 112, 116. The electric motors 216 and gearboxes 220 shown in FIG. 2 may correspond to the motors gearbox units 130A-D associated with multiple motor gearbox drive unit 700, as described herein. In some embodiments, the electric motors 216 may include one or more of a motor controller, inverter, and/or an electrical interconnection to the power source 208. As provided above, the vehicle 100 may include an electric motor 216 configured to provide a driving force for each drive wheel 104A-D. In other cases, a single electric motor 216 may be configured to share an output force between two or more drive wheels 104A-D via one or more power transmission components, drive shafts, differentials, etc. It is an aspect of the present disclosure that the powertrain 105 may include one or more power transmission components, motor controllers, and/or power controllers 214 that can provide a controlled output of power to one or more of the drive wheels 104A-D of the vehicle 100. The power transmission components, power controllers 214, or motor controllers may be controlled by at least one other vehicle controller or computer system as described herein. In one embodiment, the power controller 214 may be part of the battery system or power source 208. In some embodiments, the power controller 214 may be separate from, but electrically interconnected with, the power source 208. In some embodiments, the power controller 214 may be part of the inverter.

As provided above, the powertrain 105 of the vehicle 100 may include one or more power source 208. The power source 208 may be configured to provide drive power, system and/or subsystem power, accessory power, etc. While described herein as a single power source 208 for sake of clarity, embodiments of the present disclosure are not so limited. For example, it should be appreciated that independent, different, or separate power sources 208 may provide power to various systems of the vehicle 100. For instance, a drive power source may be configured to provide the power for the one or more electric motors 216 of the vehicle 100, while a system power source may be configured to provide the power for one or more other systems and/or subsystems of the vehicle 100. Other power sources may include an accessory power source, a backup power source, a critical system power source, and/or other separate power sources. Separating the power sources 208 in this manner may provide a number of benefits over conventional vehicle systems. For example, separating the power sources 208 can allow one of the power sources 208 to be removed and/or replaced independently without requiring that power be removed from all systems and/or subsystems of the vehicle 100 during a power source 208 removal/replacement. For instance, one or more of the accessories, communications, safety equipment, and/or backup power systems, etc., may be maintained even when a particular power source 208 is depleted, removed, or becomes otherwise inoperable.

In some embodiments, the drive power source may be separated into two or more batteries, modules, cells, units, sources, and/or systems. By way of example, a vehicle 100 may include a first drive power source and a second drive power source. The first drive power source may be operated independently from or in conjunction with the second drive power source, and vice versa. Continuing this example, the first drive power source may be removed from a vehicle 100 while a second drive power source can be maintained in the vehicle 100 to provide drive power. This approach allows the vehicle 100 to significantly reduce weight (e.g., of the first drive power source, etc.) and improve power consumption, even if only for a temporary period of time.

The powertrain 105 includes one or more power distribution systems configured to transmit power from the power source 208 to one or more electric motors 216 in the vehicle 100. The power distribution system may include electrical interconnections 224 in the form of cables, wires, traces, wireless power transmission systems, contactors, relays, fuses, etc., and/or combinations thereof. It is an aspect of the present disclosure that the vehicle 100 include one or more redundant electrical interconnections to the power distribution system. The redundant electrical interconnections 232 can allow power to be distributed to one or more systems and/or subsystems of the vehicle 100 even in the event of a failure of an electrical interconnection portion of the vehicle 100 (e.g., due to an accident, mishap, tampering, or other harm to a particular electrical interconnection, etc.). In some embodiments, a user of a vehicle 100 may be alerted via a user interface associated with the vehicle 100 that a redundant electrical interconnection is being used and/or damage has occurred to a particular area of the vehicle electrical system. In any event, the one or more redundant electrical interconnections may be configured along completely different routes than the electrical interconnections 224 shown and/or include different modes of failure than the electrical interconnections 224 to, among other things, prevent a total interruption power distribution in the event of a failure.

Figure 3:
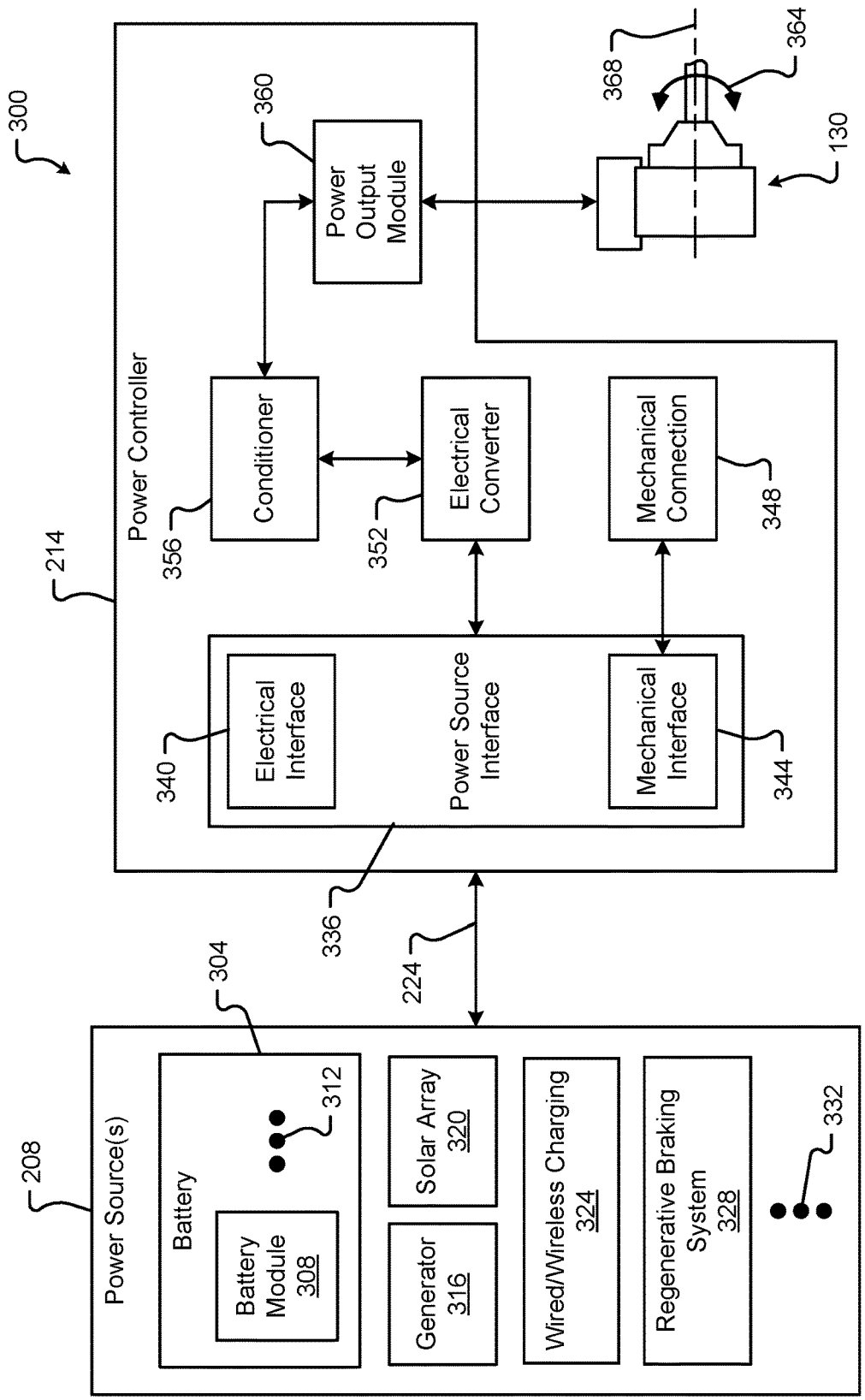
FIG. 3 is a block diagram of a power control system of the vehicle in accordance with embodiments of the present disclosure.

FIG. 3 shows a block diagram of a power control system 300 of the vehicle 100 in accordance with embodiments of the present disclosure. In particular, the power control system 300 may include a vehicle power source 208 electrically interconnected with the power controller 214. The vehicle 100 may include at least one power source 208 that generates and/or stores power, and/or load(s) (e.g., inverters, motors 216, motor gearbox units 130A-D, devices, systems, subsystems, etc.) that consume power. The power output from the power source 208 may be managed by a power controller 214. Further, the power control system 300 can include one or more other interfaces or controllers other than those shown in FIG. 3.

The power controller 214 can be a computer or computing system(s) and/or electrical system with associated components, as described herein, capable of managing the power output module 360 to receive power, routing the power to and/or from the power source 208, and then providing the power from the power source 208 to at least one load (e.g., motor 216, inverter, motor gearbox unit 130, etc.). Thus, the power controller 214 may execute programming that controls switches, devices, components, etc. involved in the reception, storage, and provision of the power in the power control system 300.

The power sources 208 can include power sources internal and/or associated with the vehicle 100 and/or power sources external to the vehicle 100 to which the vehicle 100 electrically connects. In one embodiment, the power source 208 may include a battery 304. The battery 304 may include one or more battery modules 308, battery management systems, and/or other components 312. The battery 304 may be any type of battery for storing electrical energy, for example, a lithium ion battery, a lead acid battery, a nickel cadmium battery, etc. Further, the battery 304 may include different types of power storage systems, such as, ionic fluids or other types of fuel cell systems. The battery 304 may also include one or more high-capacity capacitors. The capacitors may be used for long-term or short-term storage of electrical energy. The input into the battery 304 or capacitor may be different from the output, and thus, the capacitor may be charged quickly but drain slowly. The functioning of the converter 352 and battery 304 capacitor may be monitored or managed by a charge management unit.

One of the internal power sources can include an on board generator 316. The generator 316 may be an AC generator, a direct current DC generator, or a self-excited generator. The AC generators can include induction generators, linear electric generators, and/or other types of generators. The DC generators can include homopolar generators and/or other types of generators. The generator 316 can be brushless or include brush contacts and generate the electric field with permanent magnets or through induction. The generator 316 may be mechanically coupled to a source of kinetic energy, such as an axle 106, 108, 112, 116 or some other power take-off. The generator 316 may also have another mechanical coupling to an exterior source of kinetic energy, for example, a wind turbine.

In some embodiments, a source of power internal to or associated with the vehicle 100, may be a solar array 320. The solar array 320 may include any system or device of one or more solar cells, or photovoltaics, mounted on the exterior of the vehicle 100 or integrated within the body panels of the vehicle 100 that provides or converts solar energy into electrical energy to provide power to the battery 304 and/or one or more battery modules 308.

Another power source 208 may include wired or wireless charging 324. The wireless charging system 324 may include inductive and/or resonant frequency inductive charging systems that can include coils, frequency generators, controllers, etc. Wired charging may be any kind of grid-connected charging that has a physical connection, although, the wireless charging may be grid connected through a wireless interface. The wired charging system 324 can include connectors, wired interconnections, the controllers, etc. The wireless charging system 324 may include capacitive charging systems that can include capacitors, frequency generators, controllers, etc. The wired and wireless charging systems 324 can provide power to the battery 304 and/or one or more battery modules 308 from external power sources.

Internal sources for power may include a regenerative braking system 328. The regenerative braking system 328 can convert the kinetic energy of the moving vehicle into electrical energy through a generation system mounted within the wheels, axle, and/or braking system of the vehicle 100. The regenerative braking system 328 can include any coils, magnets, electrical interconnections, converters, controllers, etc. required to convert the kinetic energy into electrical energy.

The power source 208 may be connected to the power controller 214 through an electrical interconnection 224. The electrical interconnection 224 can include any wire, interface, bus, etc. between the one or more power sources 208 and the power controller 214.

The power controller 214 can also include a power source interface 336. The power source interface 336 can be any type of physical and/or electrical interface used to receive the electrical energy from the one or more power sources 208; thus, the power source interface 336 can include an electrical interface 340 that receives the electrical energy and a mechanical interface 344 which may include wires, connectors, or other types of devices or physical connections. The mechanical interface 344 can also include a physical/electrical connection 224 to the power controller 214.

The electrical energy from the power source 208 can be processed through the power source interface 336 to an electric converter 352. The electric converter 352 may convert the characteristics of the power from one of the power sources 208 into a useable form that may be used either by the battery 304 or one or more loads associated with the vehicle 100. The electrical converter 352 may include any electronics or electrical devices and/or component that can change electrical characteristics, e.g., AC frequency, amplitude, phase, etc. associated with the electrical energy provided by the power source 208. The converted electrical energy may then be provided to an optional conditioner 356. The conditioner 356 may include any electronics or electrical devices and/or component that may further condition the converted electrical energy by removing harmonics, noise, etc. from the electrical energy to provide a more stable and effective form of power to the vehicle 100.

In some embodiments, the power controller 214 may include one or more processors, controllers, and/or power output modules 360 configured to control and manage power output from the power source 208 to one or more motors or other loads of the vehicle 100. The power output module 360 may include one or more processor, a memory, switch, and/or electrical interconnection. In one embodiment, the power output module 360 may be configured to receive electrical energy provided by the power source 208 and control an output of the energy to the motors 216 and/or inverters described herein. In some cases, the power output module 360 may include one or more motor controllers.

As shown in FIG. 3, the loads of the vehicle 100 may include at least one motor gearbox unit 130 and/or multiple motor gearbox drive unit 700. The motor gearbox unit 130, and/or multiple motor gearbox drive unit 700, may include an inverter, an electric motor 216, and a gearbox 220. The gearbox 220 may include at least one power output shaft configured to provide rotational movement 364 in a direction about an output shaft axis 368. In some embodiments, the electric motor 216 can be any type of DC or AC electric motor. In some embodiments, for example, where the motor 216 is a DC motor, the motor gearbox unit 130 and/or multiple motor gearbox drive unit 700 may not require an inverter. The motor 216 may be an induction motor (asynchronous motor), a motor with permanent magnets (synchronous motor), a reluctance motor, a universal motor, a linear motor, and/or any combination thereof having windings either on the stator, or rotor, or both the stator and rotor. The motor 216 may also be wireless or include brush contacts. In any event, the motor 216 may be capable of providing a torque and enough kinetic energy to move the vehicle 100.

Figure 4:
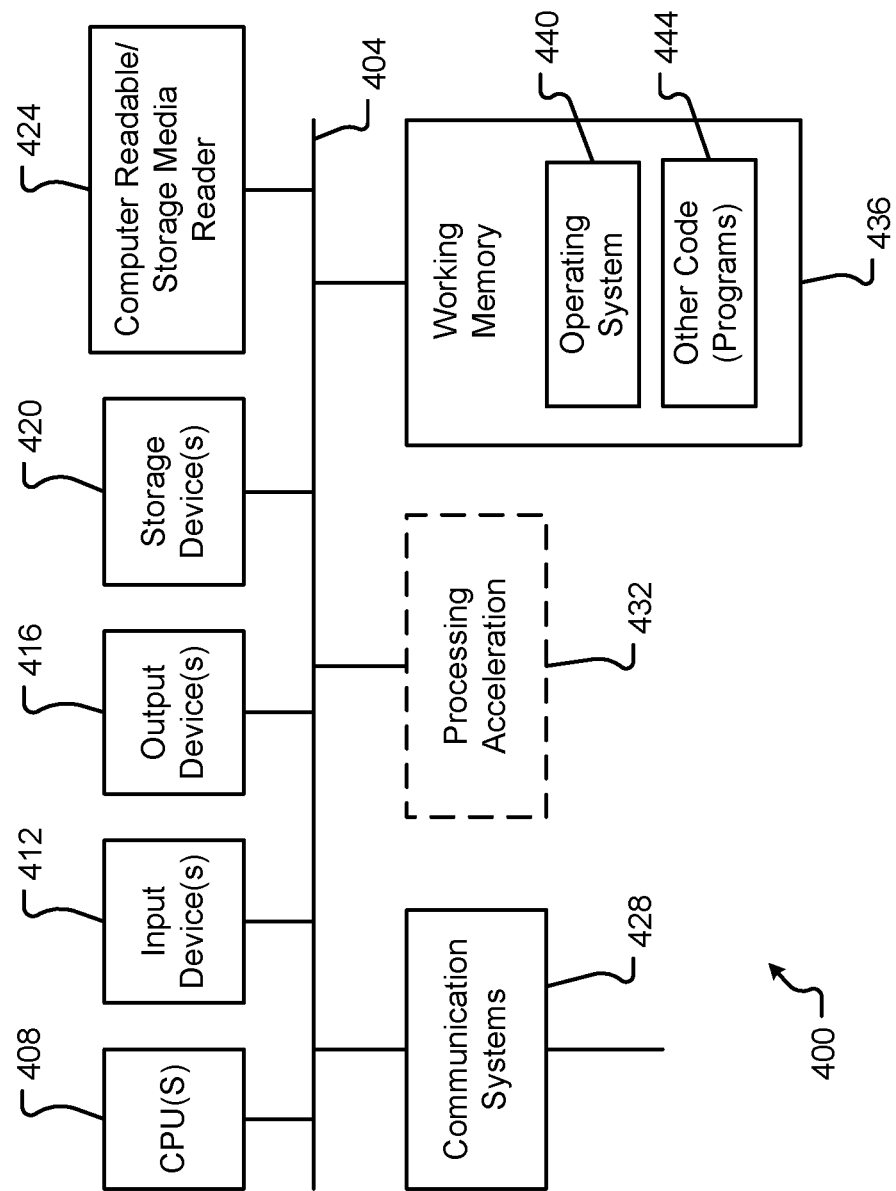
FIG. 4 is a block diagram of a computing device associated with one or more components of the vehicle in accordance with embodiments of the present disclosure.

FIG. 4 illustrates one embodiment of a computer system 400 upon which the processors, computers, computing devices, or other systems or components (e.g., power output module 360, etc.) described herein may be deployed or executed. The computer system 400 is shown comprising hardware elements that may be electrically coupled via a bus 404. The hardware elements may include one or more central processing units (CPUs) 408; one or more input devices 412 (e.g., a mouse, a keyboard, a sensor, a logic device, etc.); and one or more output devices 416 (e.g., a display device, a printer, a solenoid, a relay, etc.). The computer system 400 may also include one or more storage devices 420. By way of example, storage device(s) 420 may be disk drives, optical storage devices, solid-state storage devices such as a random access memory ("RAM") and/or a read-only memory ("ROM"), which can be programmable, flash-updateable and/or the like. In some embodiments, the computer system 400 may be associated with a power controller 214, an engine control unit ("ECU"), a vehicle control unit ("VCU"), a microcontroller unit ("MCU"), and/or some other controller having a processor and a computer readable storage medium having processor executable instructions stored thereon.

The computer system 400 may additionally include a computer-readable storage media reader 424; a communications system 428 (e.g., a modem, a network card (wireless or wired), an infra-red communication device, etc.); and working memory 436, which may include RAM and ROM devices as described above. The computer system 400 may also include a processing acceleration unit 432, which can include a DSP, a special-purpose processor, and/or the like.

The computer-readable storage media reader 424 can further be connected to a computer-readable storage medium, together (and, optionally, in combination with storage device(s) 420) comprehensively representing remote, local, fixed, and/or removable storage devices plus storage media for temporarily and/or more permanently containing computer-readable information. The communications system 428 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine readable mediums for storing information.

The computer system 400 may also comprise software elements, shown as being currently located within a working memory 436, including an operating system 440 and/or other code 444. It should be appreciated that alternate embodiments of a computer system 400 may have numerous variations from that described above. For example, customized hardware might also be used, and/or particular elements might be implemented in hardware, software (including portable software, such as applets), or both. Further, connection to other computing devices such as network input/output devices may be employed.

Examples of the processors 408 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™ processors, ARM® Cortex-A and ARM926EJ-S™ processors, Infineon TriCore™ processors, other industry-equivalent processors, and may perform computational functions using any known or future-developed standard, instruction set, libraries, and/or architecture.

Figure 5:
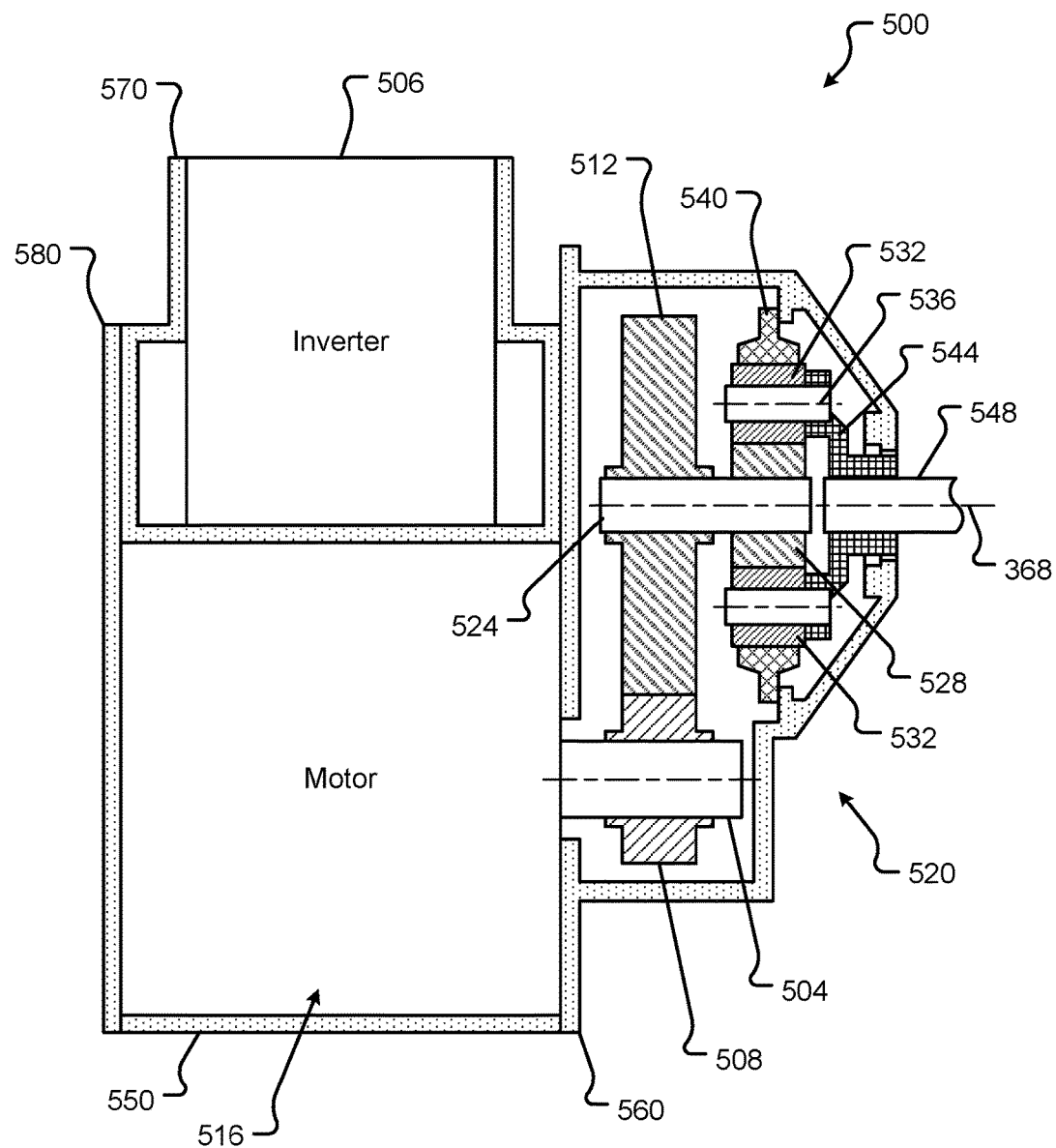
FIG. 5 shows a section view of a motor gearbox unit in accordance with embodiments of the present disclosure.

FIG. 5 shows a section view of a motor gearbox unit 500 in accordance with embodiments of the present disclosure. The motor gearbox unit 500 of FIG. 5 may be similar, if not identical, to the motor gearbox units 130, 130A-D and/or the multiple motor gearbox drive unit 700 as described at least in conjunction with FIGS. 1-3, and 7A-7F. The motor gearbox unit 500 may include an electric motor 516 mechanically interconnected to a gearbox 520 via a motor drive shaft 504. As can be appreciated, the motor 516 may be similar, if not identical, to the motor 216 described in conjunction with FIGS. 1-3. In some embodiments, the motor gearbox unit 500 may include an inverter 506 that receives DC power and outputs AC power to the motor 516. The inverter 506 may serve to regulate the power fed to the motor 516.

The motor gearbox unit 500 may include a motor 516 having a motor drive shaft 504 that is offset from a gearbox power output shaft 548. For instance, the motor 516 and the motor drive shaft 504 may be arranged close to, or in contact with, a base 550 of the motor gearbox unit 500, while the gearbox 520 may be arranged further apart, or offset, from the base 550 of the motor gearbox unit 500. Among other things, this arrangement may provide a lower center of gravity for the motor gearbox unit 500 (the motor comprising the greatest mass of the unit 500) and thus provide increased stability for a vehicle 100 (as the base 550 of the motor gearbox unit 500 may be maintained in contact with a portion of the frame 102 of the vehicle 100). In some embodiments, the power output shaft 548 of the gearbox 520 may be offset in a first direction from the motor drive shaft 504 by a distance, for example, the vertical direction shown in FIG. 5. Additionally or alternatively, the gearbox power output shaft 548 may be offset in a second direction from the motor drive shaft 504, for example, the horizontal direction shown in FIG. 5. In one embodiment, the gearbox power output shaft 548 may be offset in a third direction from the motor drive shaft 504 such that the output shaft axis 368 is offset in a direction into, or out of, the page a distance from the axis of the motor drive shaft 504. In any event, the offset may be set based on an arrangement of the gears in the gearbox 520.

As shown in FIG. 5, the motor drive shaft 504 may be directly connected to a drive gear 508. The drive gear 508 meshes with the intermediate driven gear 512 which is configured to rotate about the intermediate shaft 524. Power transmitted to the intermediate driven gear 512 may be caused to further transmit to an epicyclic reducer or other gear set. The epicyclic reducer can be a planetary, a star or a sun configuration. As shown in FIG. 5, the gear set may be a planetary stage reducer.

In some embodiments, the intermediate shaft 524 and sun gear 528 may be directly connected to (e.g., bolted, welded, press-fit, spline, keyed, etc.), or indirectly coupled with (e.g., via an additional shaft, special coupling, intermediate gears, etc.), the drive gear 508. Among other things, this arrangement allows the sun gear 528 to rotate in conjunction with the drive gear 508 (e.g., at the same or at a different speed, etc.). The sun gear 528 may engage with one or more planet gears 532 disposed around the sun gear 528. Each of the planet gears 532 may remain in constant mesh, or rotational contact, with both the sun gear 528 and the ring gear 540. For instance, the sun gear 528 may include teeth disposed at an outer diameter and along a periphery of the sun gear 528, while the ring gear 540 may include teeth disposed at an inner diameter and along an internal periphery of the ring gear 540, the planet gears 532 being disposed between the sun gear 528 and the ring gear 540. The planet gears 532 may be configured to rotate about planet gear shafts 536 that are interconnected with a carrier 544. In some embodiments, rotation of the sun gear 528 may impart a rotational force through the planet gears 532 to the carrier 544, causing the carrier 544 to rotate about the output shaft axis 368. For example, the carrier 544 may be connected to the power output shaft 548 of the gearbox 520 that rotates about the output shaft axis 368.

In some embodiments, at least one wheel 104A-D may be connected to the power output shaft 548 of the gearbox 520. As can be appreciated, the power output shaft 548 may correspond to one or more of the drive axles 106, 108, 112, 116 described in conjunction with FIGS. 1-3. In some embodiments, the power output shaft 548 and/or drive axles 106, 108, 112, 116 may be configured as drive half-shafts that are connected directly to the carrier 544 via a splined interconnection or through joint races directly machined into an inner diameter of the carrier 544.

The motor gearbox unit 500 may include a base 550, a gearbox housing 560, an inverter housing 570, and/or a motor housing 580 or end plate. In some embodiments, one or more of the inverter 506, motor 516, and/or gearbox 520 may share a portion of a housing with each other and/or another component of the motor gearbox unit 500. In one embodiment, an integral or unified housing may be employed to efficiently route coolant lines, electrical interconnections, and/or save weight, space, and/or the number of required interconnections (e.g., fasteners, joints, etc.).

Figure 6:
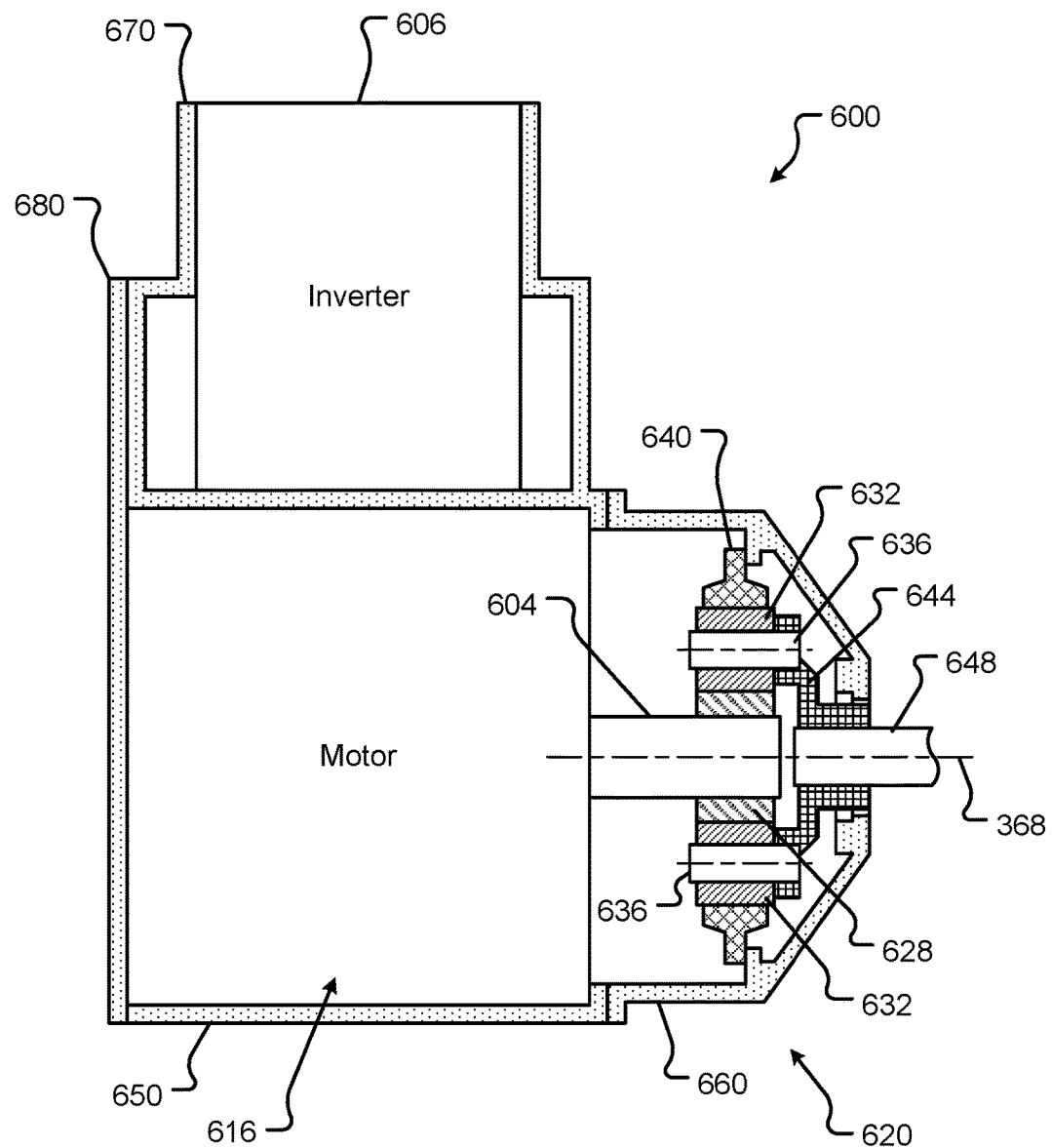
FIG. 6 shows a section view of a motor gearbox unit in accordance with embodiments of the present disclosure.

FIG. 6 shows a section view of a motor gearbox unit 600 in accordance with embodiments of the present disclosure. The motor gearbox unit 600 of FIG. 6 may be similar, if not identical, to the motor gearbox units 130, 130A-D and/or the multiple motor gearbox drive unit 700 as described at least in conjunction with FIGS. 1-3, and 7A-7F and may include one or more features described in conjunction with the motor gearbox unit 500 FIG. 5. The motor gearbox unit 600 may include an electric motor 616 mechanically interconnected to a gearbox 620 via a motor drive shaft 604. As can be appreciated, the motor 616 may be similar, if not identical, to the motors 216, 516 described in conjunction with FIGS. 1-3, and 5. In some embodiments, the motor gearbox unit 600 may include an inverter 606 that receives DC power and outputs AC power to the motor 616. The inverter 606 may serve to regulate the power fed to the motor 616.

The motor gearbox unit 600 may include a motor 616 having a motor drive shaft 604 that is coaxial with a gearbox power output shaft 648. For instance, the motor drive shaft 604 may be arranged in-line with the power output shaft 648 of the gearbox 620. In this configuration, the axis of the motor drive shaft 604 may be colinear, and/or coaxial, with the output shaft axis 368 of the gearbox 620.

As shown in FIG. 6, the motor drive shaft 604 may be directly connected to an epicyclic reducer or other gear set. The epicyclic reducer can be a planetary, a star, or a sun configuration (e.g., a planetary stage reducer, etc.). For instance, the motor drive shaft 604 may be connected to a sun gear 628 that rotates in concert with the motor drive shaft 604. In some embodiments, the sun gear 628 may be directly connected to (e.g., bolted, welded, press-fit, spline, keyed, etc.), or indirectly coupled with (e.g., via an additional shaft, special coupling, intermediate gears, etc.), the drive shaft 604. The sun gear 628 may engage with one or more planet gears 632 disposed around the sun gear 628. Each of the planet gears 632 may remain in constant mesh, or rotational contact, with both the sun gear 628 and the ring gear 640. For instance, the sun gear 628 may include teeth disposed at an outer diameter and along a periphery of the sun gear 628, while the ring gear 640 may include teeth disposed at an inner diameter and along an internal periphery of the ring gear 640, the planet gears 632 being disposed between the sun gear 628 and the ring gear 640. The planet gears 632 may be configured to rotate about planet gear shafts 636 that are interconnected with a carrier 644. In some embodiments, rotation of the sun gear 628 may impart a rotational force through the planet gears 632 to the carrier 644, causing the carrier 644 to rotate about the output shaft axis 368. For example, the carrier 644 may be connected to the power output shaft 648 of the gearbox 620 that rotates about the output shaft axis 368.

In some embodiments, at least one wheel 104A-D may be connected to the power output shaft 648 of the gearbox 620. As can be appreciated, the power output shaft 648 may correspond to one or more of the drive axles 106, 108, 112, 116 described in conjunction with FIGS. 1-3. In some embodiments, the power output shaft 648 and/or drive axles 106, 108, 112, 116 may be configured as drive half-shafts that are connected directly to the carrier 644 via a splined interconnection or through joint races directly machined into an inner diameter of the carrier 644.

The motor gearbox unit 600 may include a base 650, a gearbox housing 660, an inverter housing 670, and/or a motor housing 680 or end plate. In some embodiments, one or more of the inverter 606, motor 616, and/or gearbox 620 may share a portion of a housing with each other and/or another component of the motor gearbox unit 600. In one embodiment, an integral or unified housing may be employed to efficiently route coolant lines, electrical interconnections, and/or save weight, space, and/or the number of required interconnections (e.g., fasteners, joints, etc.).

FIGS. 7A-7F show various views of a compact side-by-side motor gearbox unit, or a multiple motor gearbox drive unit, 700 in accordance with embodiments of the present disclosure. The multiple motor gearbox drive unit 700 includes two independent motors 716A, 716B arranged adjacent to one another along a common plane running through the center of each motor 716A, 716B and drive shaft 704A, 704B. In this arrangement, the drive shaft 704A of the first motor 716A is oriented, or facing, a direction opposite that of the drive shaft 704B of the second motor 716B. More specifically, the end of the drive shaft 704A including a drive gear 708A of the first motor 716A is oriented facing a direction opposite the end of the drive shaft 704B including a drive gear 708B of the second motor 716B. In some embodiments, the axis of each drive shaft 704A, 704B may be parallel to, and offset from one another by a specific distance, such that the axes of the drive shafts 704A, 704B are not coaxial or colinear with one another. Among other things, the multiple motor gearbox drive unit 700 provides a compact packaging of two independent motor gearbox units as an integrated high power density torque vectoring e-drive axle.

Figure 7A:
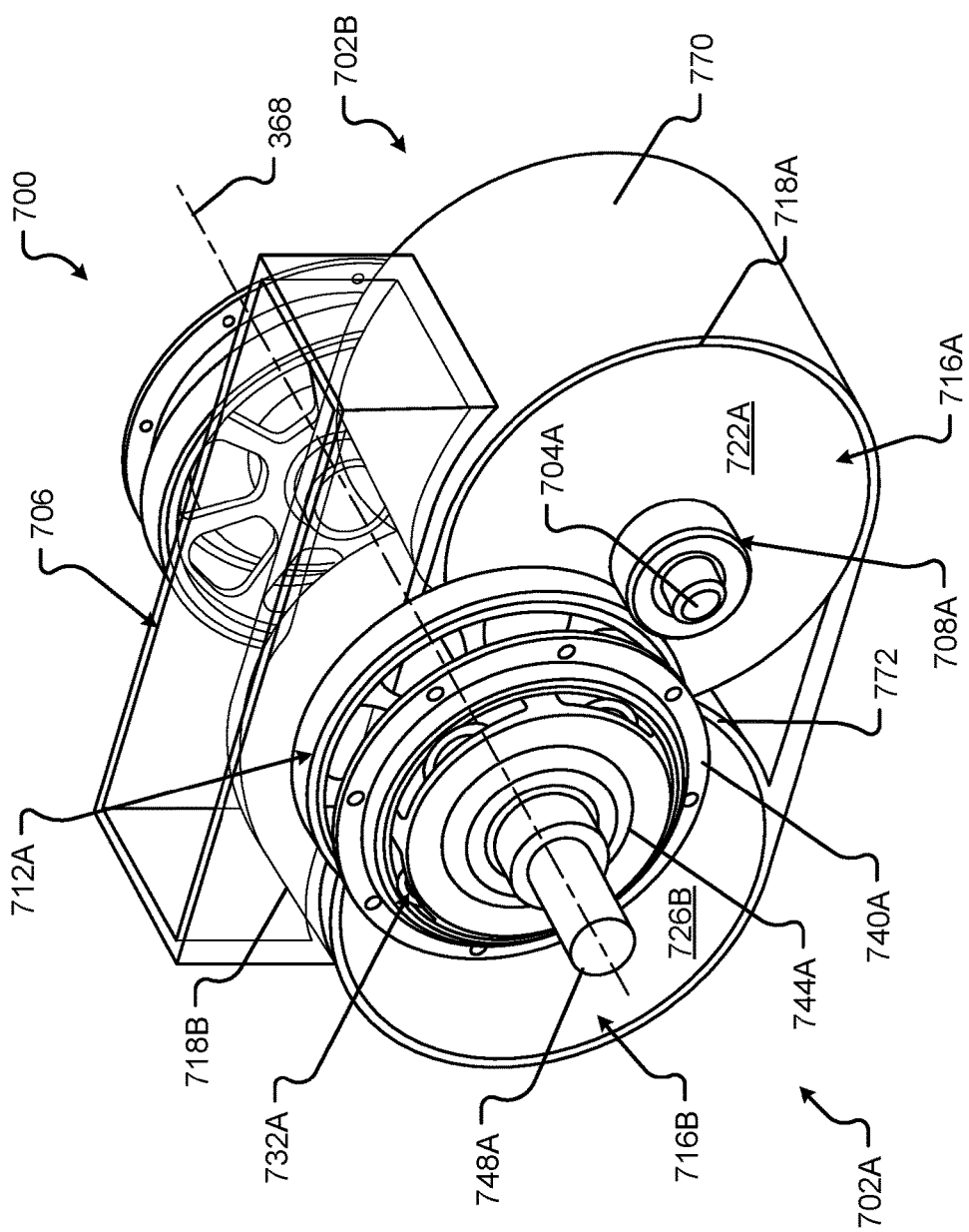
FIG. 7A shows a perspective view of a multiple motor gearbox drive unit in accordance with embodiments of the present disclosure.

In one embodiment, all of the components for each motor 716A, 716B and gearbox 720A, 720B may be identical, positioned symmetrically about a central vertical axis 790. This axis of symmetry 790 is illustrated in FIGS. 7C-7E. In one embodiment, the two independent motors 716A, 716B may be located side-by-side and in opposite directions, where a first motor 716A may be configured to drive at least one of the wheels 104A, 104C on a first side (e.g., the left side, etc.) of the vehicle 100 through its own gearbox 720A, and the second motor 716B may be configured to drive at least another wheel 104B, 104D on a second side (e.g., the right side, etc.) of the vehicle 100 through an identical, but oppositely mounted, gearbox 720B.

In some cases, the gearboxes 720A, 720B may be double-stage, single-speed type. For instance, the first stage may be a parallel shaft meshing with the drive gear 704A, 704B directly connected to the motor 716A, 716B. The drive gears 704A, 704B of both gearboxes 720A, 720B, may be symmetrical and 180 degrees to one another, while the power output coupling of each gearbox 720A, 720B may share a common power output axis 368. Additionally or alternatively, this centerline or axis 368 may be the centerline of the half-shafts or drive axles 106, 108, 112, 116 connected to the gearbox 720A, 720B. In one embodiment, the second stage is an epicyclic reducer. The epicyclic reducer can be a planetary, a star, or a sun configuration. As shown in FIGS. 7A-7F, the second stage may include a planetary stage reducer.

In some embodiments, the intermediate shaft 724A, 724B and sun gear 728A, 728B may be directly connected to (e.g., bolted, welded, press-fit, spline, keyed, etc.), or indirectly coupled with (e.g., via an additional shaft, special coupling, intermediate gears, etc.), the drive gear 708A, 708B, respectively. Similar to the gear engagement shown in FIG. 5, the drive gears 708A, 708B of the multiple motor gearbox drive unit 700 may mesh with the intermediate driven gears 712A, 712B. In any event, this arrangement allows each sun gear 728A, 728B to rotate in conjunction with the respective drive gear 708A, 708B (e.g., at the same or at a different speed, etc.). The sun gear 728A, 728B may engage with one or more planet gears 732A, 732B disposed around the respective sun gear 728A, 728B. Each of the planet gears 732A, 732B may remain in constant mesh, or rotational contact, with both the sun gear 728A, 728B and the ring gear 740A, 740B. For instance, the sun gear 728A, 728B may include teeth disposed at an outer diameter and along a periphery of the sun gear 728A, 728B, while the ring gear 740A, 740B may include teeth disposed at an inner diameter and along an internal periphery of the ring gear 740A, 740B, the planet gears 732A, 732B being disposed between the sun gear 728A, 728B and the ring gear 740A, 740B. The planet gears 732A, 732B may be configured to rotate about planet gear shafts 736A, 736B that are interconnected with a respective carrier 744A, 744B. In some embodiments, rotation of the sun gear 728A, 728B may impart a rotational force through the planet gears 732A, 732B to their respective carrier 744A, 744B, causing the carrier 744A, 744B to rotate about the output shaft axis 368. For example, the first carrier 744A may be connected to the power output shaft 748A of the first gearbox 720A that rotates about the output shaft axis 368 and the second carrier 744B may be connected to the power output shaft 748B of the second gearbox 720B that rotates about the output shaft axis 368. It should be appreciated that while shown as including a power output shaft 748A, 748B, each gearbox 720A, 720B of the multiple motor gearbox drive unit 700 may comprise any type of power output coupling including, but in no way limited to, a receptacle, a clamp, a splined interconnection, a joint, a keyed shaft, a keyed hole, etc., and/or combinations thereof.

As described above, the multiple motor gearbox drive unit 700 may include two motor gearbox interconnections, each including a motor 716A, 716B having a motor drive shaft 704A, 704B that is offset from a gearbox power output shaft 748A, 748B, respectively. For instance, the first motor 716A and the first motor drive shaft 704A may be arranged close to, or in contact with, a base of the housing 770 of the multiple motor gearbox drive unit 700, while the gearbox 720A may be arranged further apart, or offset, from the base of the housing 770 of the multiple motor gearbox drive unit 700. Among other things, this arrangement may provide a lower center of gravity for the multiple motor gearbox drive unit 700 (the motor 716A and motor body 718 comprising the greatest mass of the unit 700) and thus provide increased stability for a vehicle 100. For example, the base of the housing 770 of the multiple motor gearbox drive unit 700 may be maintained in contact with a portion of the frame 102 of the vehicle 100. The second motor 716B and gearbox 720B may be similarly, if not identically, arranged on the opposite side of the housing 770.

Figure 7B:
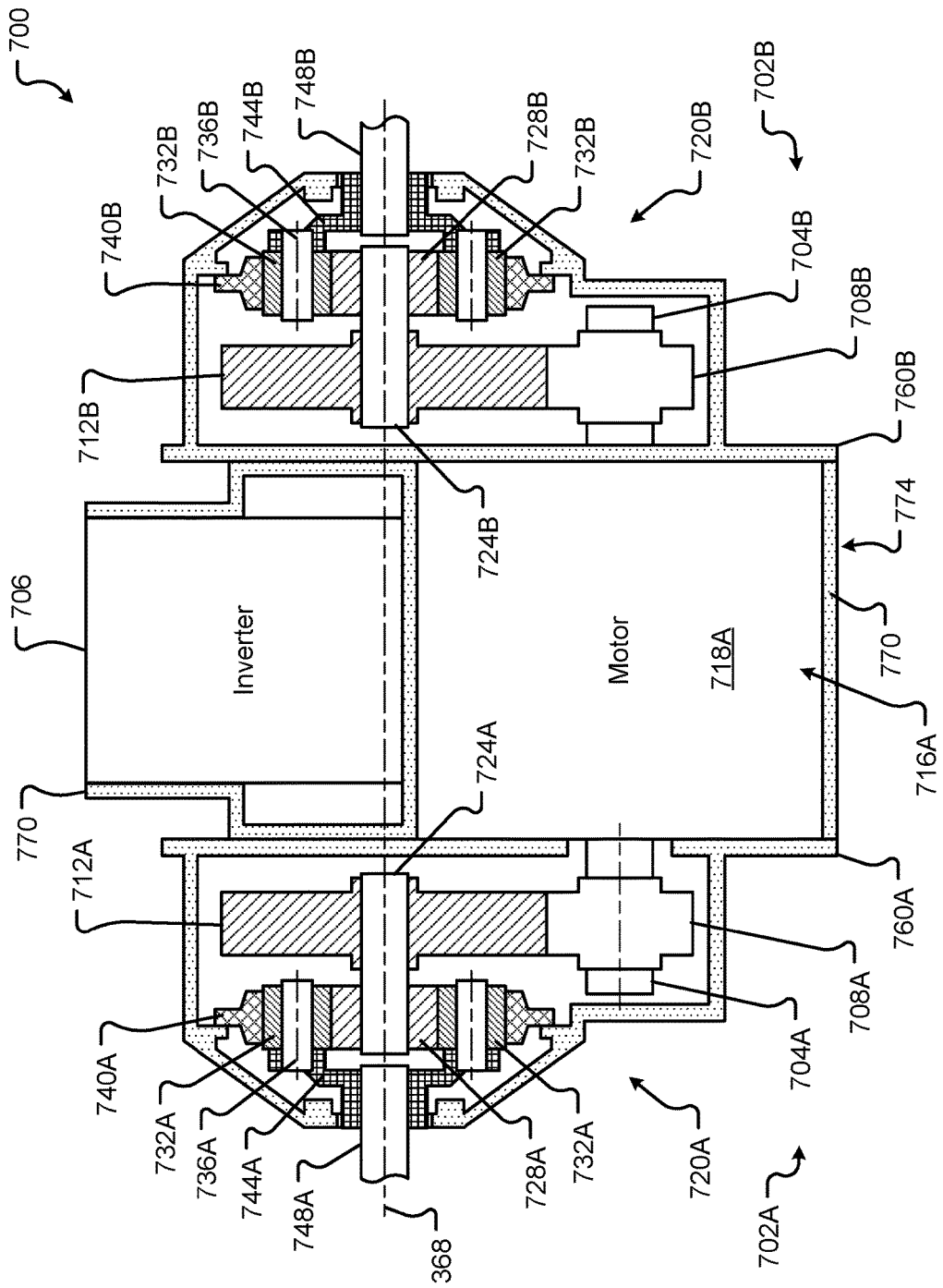
FIG. 7B shows a section view of the multiple motor gearbox drive unit in accordance with embodiments of the present disclosure.
Figure 7C:
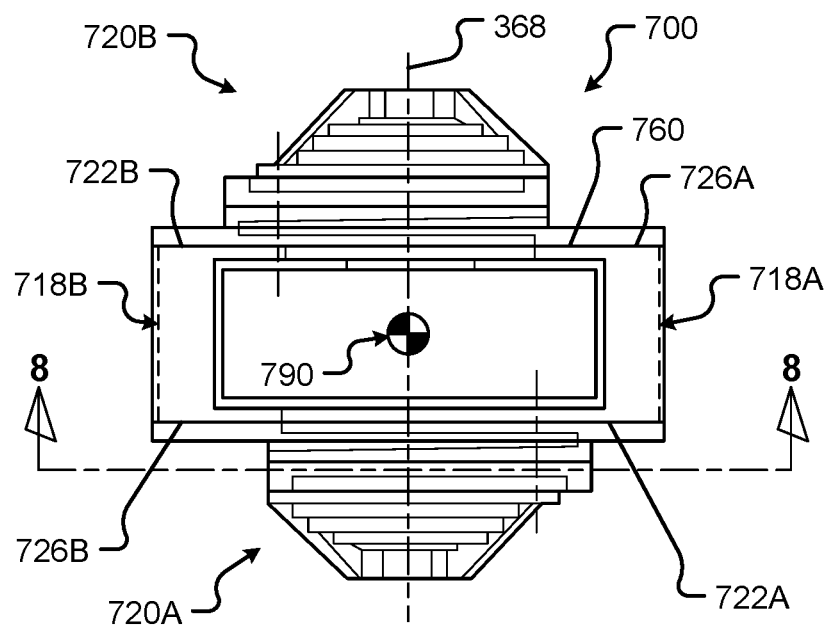
FIG. 7C shows a plan view of the multiple motor gearbox drive unit in accordance with embodiments of the present disclosure.
Figure 7D:
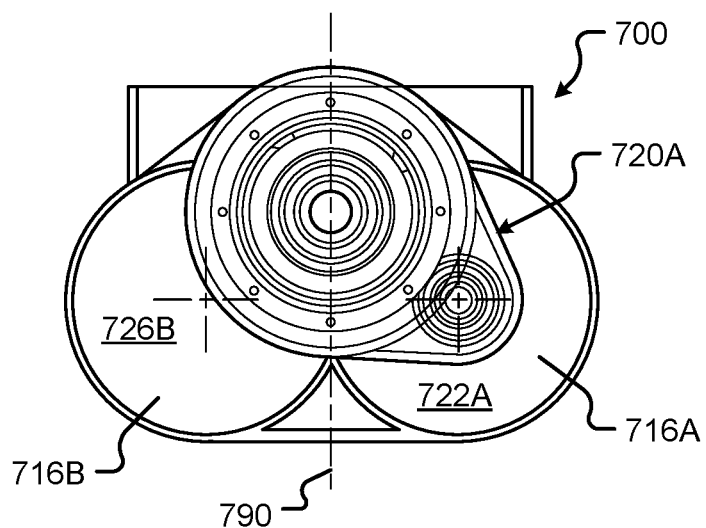
FIG. 7D shows a first elevation view of the multiple motor gearbox drive unit in accordance with embodiments of the present disclosure.
Figure 7E:
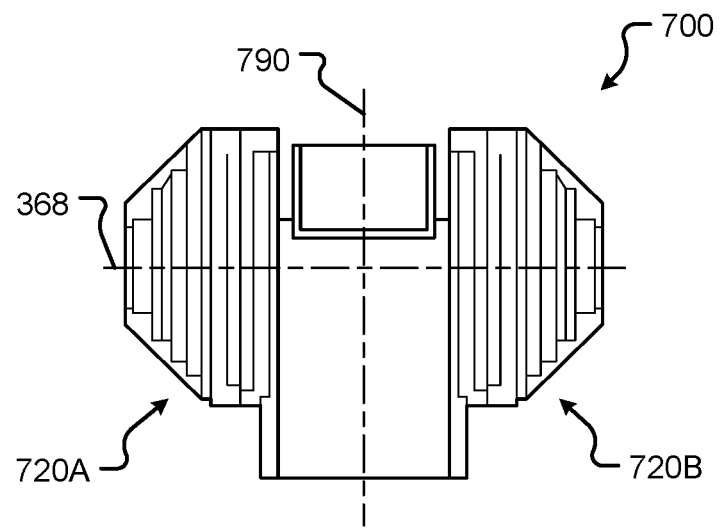
FIG. 7E shows a second elevation view of the multiple motor gearbox drive unit in accordance with embodiments of the present disclosure.

In some embodiments, a first power output shaft 748A of the first gearbox 720A may be offset in a first direction from the first motor drive shaft 704A by a distance, for example, the vertical direction shown in FIG. 7B. The second power output shaft 748B of the second gearbox 720B may be offset in the same first direction from the first motor drive shaft 704A and the second motor drive shaft 704B, as both the first and second motor drive shafts 704A, 704B may be coplanar with one another in the shared, or common, housing 770. Additionally or alternatively, the gearbox power output coupling and/or shaft 748A, 748B of each gearbox 720A, 720B may be aligned with a center of the multiple motor gearbox drive unit 700 and offset in a second direction from each motor drive shaft 704A, 704B, respectively (e.g., the horizontal direction shown in FIG. 7B). In one embodiment, the first gearbox power output coupling or shaft 748A may be offset in a third direction from the first motor drive shaft 704A, such that the output shaft axis 368 is offset in a direction (e.g., into the page of FIG. 7B) a distance from the axis of the first motor drive shaft 704A, while the second gearbox power output coupling or shaft 748B may be offset in a an opposite direction from the second motor drive shaft 704B (e.g., out of the page of FIG. 7), such that each power output coupling or shaft 748A, 748B is colinear with the shared output shaft axis 368. The offset distance between the first gearbox 720A and the first motor drive shaft 704A and the offset distance between the second gearbox 720B and the second motor drive shaft 704B may be defined, or set, based on a size and/or an arrangement of the gears in each gearbox 720A, 720B, respectively.

In some embodiments, at least one drive wheel 104A-D may be connected to the first power output shaft 748A of the first gearbox 720A. Additionally or alternatively, at least one other drive wheel 104A-D may be connected to the second power output shaft 748B of the second gearbox 720B. In any event, the power output shafts 748A, 748B may correspond to one or more of the drive axles 106, 108, 112, 116 described in conjunction with FIGS. 1-3. In some embodiments, the power output shafts 748A, 748B and/or drive axles 106, 108, 112, 116 may be configured as drive half-shafts that are connected directly to a respective carrier 744A. 744B via a splined interconnection or through joint races directly machined into an inner diameter of the carrier 744A, 744B.

In some embodiments, the multiple motor gearbox drive unit 700 may include two independent motors 716A, 716B, each including an offset gearbox 720A, 720B having a shared power output shaft axis 368. For instance, a first drive gear 708A and first gearbox 720A associated with a first motor 716A may be disposed on a first side 702A of a housing 770, while a second drive gear 708B and second gearbox 720B associated with a second motor 716B may be disposed on a second side 702B of the housing 770. In some embodiments, the first and second motors 716A, 716B may each be arranged with their respective gearboxes 720A, 720B similarly, if not identically, to the motor 516 and gearbox 520 arrangement described in conjunction with FIG. 5. The housing 770 may be a shared, or common, housing having one or more receptacles or receiving features to receive each motor 716A, 716B.

In one embodiment, the multiple motor gearbox drive unit 700 and/or each motor 716A, 716B and gearbox 720A, 720B may include one or more features, components, relationships, orientations, etc., as described in conjunction with the motor gearbox unit 500 of FIG. 5. Additionally or alternatively, the multiple motor gearbox drive unit 700 of FIGS. 7A-7F may be similar, if not identical, to the motor gearbox units 130, 130A-D as described in conjunction with FIGS. 1-3. The multiple motor gearbox drive unit 700 may include a first and second electric motor 716A, 716B mechanically interconnected to a gearbox 720A, 720B via a motor drive shaft 704A, 704B, respectively. As can be appreciated, the motors 716A, 716B may be similar, if not identical, to the motor 216 described in conjunction with FIGS. 1-3. In some embodiments, the multiple motor gearbox drive unit 700 may include at least one inverter 706 that receives DC power and outputs AC power to the one or more of the motors 716A, 716B. The inverter 706 may serve to regulate the power fed to one or both of the motors 716A, 716B. In some embodiments, the multiple motor gearbox drive unit 700 may include a dual inverter, or two inverters, such that each motor 716A, 716B is provided with its own inverter.

In one embodiment, the multiple motor gearbox drive unit 700 may be configured to maximize half-shaft lengths and reduce the packaging size (e.g., overall dimensions, length× width×height, etc.) of the multiple motor gearbox drive unit 700 in the vehicle 100. Among other things, this unique packaging provides a high power density and lower position (e.g., lowering the center of gravity of the vehicle, etc.) of the c multiple motor gearbox drive unit 700, which can result in improved vehicle dynamics. An additional benefit of the compact sized multiple motor gearbox drive unit 700 includes torque vectoring of the axle based on utilizing two independent motors 716A, 716B.

Referring to FIG. 7A, a perspective view of a multiple motor gearbox drive unit 700 is shown in accordance with embodiments of the present disclosure. As shown in FIG. 7A, the gearbox housings 760A, 760B associated with each side 702A, 702B of the housing 770 are removed (for clarity) and a schematic gear set between the first motor 716A and the first power output shaft 748A is illustrated. While any gear ratio, set, or arrangement may be disposed between the drive shaft 704A and the power output shaft 748A, the gear set of FIG. 7A is configured as an epicyclic reducer. Moreover, while shown including a power output shaft 748A, it should be appreciated that the multiple motor gearbox drive unit 700 may include any type of power output coupling disposed on opposite sides 702A, 702B of the housing 770 and sharing a common power output axis 368.

The first motor 716A, as illustrated in FIG. 7A, includes a first drive shaft 704A extending from a front face 722A of the first motor 716A and away from a center of the multiple motor gearbox drive unit 700. In some embodiments, the front face 722A of the first motor 716A may be substantially coincident, or coplanar, with the rear face 726B of the second motor 716B in the housing 770. In one embodiment, the front face 722A of the first motor 716A may be adjacent to and offset from the rear face 726B of the second motor 716B in the housing 770, such that the front face 722A of the first motor 716A is closer (in distance) to the rear face 726B of the second motor 716B than the front face 722B of the second motor. In any event, the front face 722A of the first motor 716A may be facing a first direction while the front face 722B of the second motor 716B may be facing a second direction opposite the first direction.

In some embodiments, the first and second motors 716A, 716B may be packaged at least partially inside the housing 770 such that the first gearbox 720A is spaced apart from the second gearbox 720B along the shared power output axis 368 by a distance substantially equal to a length of a single motor 716A, 716B (e.g., including clearances, minimal housing dimensions, and/or wall thicknesses, etc.). This compact arrangement may provide for additional space in the drivetrain of the vehicle 100. In one embodiment, the first and second motors 716A, 716B may be disposed side-by-side in the housing 770, separated by a wall 772 or material thickness of the housing 770. The housing 770 may include one or more receptacles, receiving cavities, or other volumes configured to at least partially receive and/or contain the first and second motors 716A, 716B and/or a portion of the motor body 718A, 718B.

Each gearbox 720A, 720B may include a separate gearbox housing 760A, 760B, respectively. The gearbox housings 760A, 760B may be configured to at least partially contain one or more elements, gears, shafts, and/or couplings of each gearbox 720A, 720B. In some embodiments, the gearbox housings 760A, 760B may be attached to, or otherwise interconnected with, the housing 770 of the motors 716A, 716B.

The multiple motor gearbox drive unit 700 may include an inverter 706 attached thereto. In one embodiment, the multiple motor gearbox drive unit 700 may include dual inverter, separate inverters for each motor, and/or other motor drive unit(s). The inverter 706 may be received by an inverter housing separate from or integrated with the housing 770 of the motors 716A, 716B or multiple motor gearbox drive unit 700. The inverter 706 may share a portion of the housing 770, a motor gearbox unit cooling system, cooling elements, electrical interconnections, and/or some other part of the multiple motor gearbox drive unit 700. In some embodiments, the inverter 706 may be mounted between the gearboxes 720A, 720B. Additionally or alternatively, the inverter 706 may be mounted directly above a portion of the motors 716A, 716B. The inverter 706 may be sized to sit above the motors 716A, 716B and below, or flush with, an uppermost portion of the gearboxes 720A, 720B or gearbox housings 760A, 760B providing a vertically compact integrated unit 700. In any event, the inverter 706 may be separated from the motors 716A, 716B by a wall thickness of the housing 770.

FIGS. 7B-7F show various views of the multiple motor gearbox drive unit 700 with the gearbox housings 760A, 760B or covers attached, in accordance with embodiments of the present disclosure. The multiple motor gearbox drive unit 700 may include a central axis of symmetry 790, about which, the motors 716A, 716B and gearboxes 720A, 720B are symmetrically arranged. In some embodiments, the central axis of symmetry 790 may represent an axis defining a location of the center of gravity for the multiple motor gearbox drive unit 700. Additionally or alternatively, the shared power output axis 368 may pass perpendicularly to, and even through, the axis of symmetry 790, as illustrated in FIG. 7E.

The multiple motor gearbox drive unit 700 offers a number of advantages beyond conventional motor gearbox unit arrangements. For instance, rather than arranging two motor gearbox units such that the motors and drive shafts are in-line, or colinear, with one another, such that each motor gearbox unit is the mirror image of the other through a planar symmetry adding to an overall length or space taken up by the package and/or powertrain elements, the multiple motor gearbox drive unit 700 allows the overall space taken up in the drive axle and power output axis 368 direction to be reduced to a minimal length. This minimal length may substantially equal the length of a single motor and two gearboxes rather than the length of two motors and two gearboxes arranged in-line. By reducing the overall package size, the multiple motor gearbox drive unit 700 allows the length and inclination of the half-drive shafts (e.g., 106, 108, 112, 116, 748A, 748B, etc.) to be optimized. Moreover, the axis symmetry of the multiple motor gearbox drive unit 700 may reduce manufacturing and/or inventory costs as the motors 716A, 716B, the gearboxes 720A, 720B, and even the gearbox housings 760A, 760B may be identical, or substantially similar.

Figure 7F:
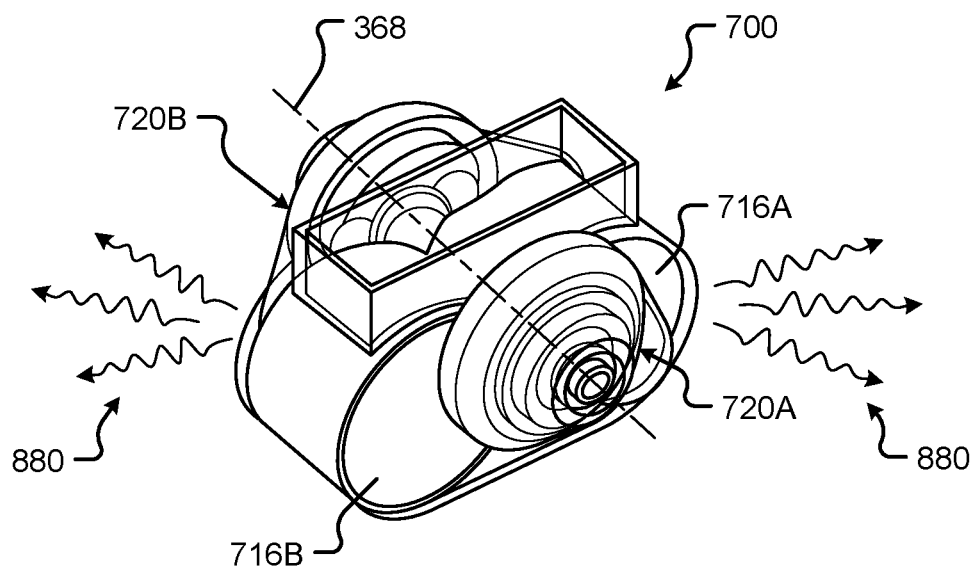
FIG. 7F shows a perspective view of the multiple motor gearbox drive unit in accordance with embodiments of the present disclosure.

In some embodiments, and as shown in FIG. 7F, the multiple motor gearbox drive unit 700 may emit a form of noise 880 (e.g., in the form of one or more noise sound waves, etc.) from at least a portion of the multiple motor gearbox drive unit 700, while the motors 716A, 716B and respective gearboxes 720A, 720B are operated, or moving. In one embodiment, the noise 880 may be emitted from at least one component housing, shared housing, mount, and/or the like. The noise 880 may including whines, rattles, etc., that are generated at one or more gear meshings of the gearboxes 720A, 720B. These noises 880 may be transmitted by vibrations through gears, shafts, bearings, and casings into the surrounding environment (as shown in FIG. 7F). In some embodiments, the intensities of these noises 880 may be directly proportional to the transmission error ("TE") of the gear mesh in each gearbox 720A, 720B.

In one embodiment, the noises 880 may be generated and propagated through all of the components (e.g., making up the multiple motor gearbox drive unit 700, etc.) up to the casing. It is an aspect of the present disclosure, where multiple (e.g., dual, etc.) independent motors and gearboxes share a same, or common, housing (e.g., as shown in FIGS. 7A-7F), to independently control each motor drive unit (e.g., motor 716A, 716B and gearbox 720A, 720B) such that the noise responses generated at each gear meshing are combined to mitigate total or cumulative noise output. In some embodiments, summation or combination of the sound wave propagations from each motor drive unit in phase opposition may cancel each other and null the noise emitted from the common housing 770.

The present disclosure provides a number of noise mitigation control strategies. For instance, in one embodiment, the stators of each motor 716A, 716B may be configured in the housing with a known angular offset angle (e.g., measured in degrees, etc.). In this case, the motors 716A, 716B can produce identical signals (e.g., noise sound waves) differentiated by a phase shift that when combined, or summed, nullify the noises generated in the respective gear meshings and in the common casing. Once the angular offset angle is determined, each multiple motor gearbox drive unit 700 may be preconfigured (e.g., at the factory, during assembly, etc.) to include the known angular offset angle in synchronization. This strategy may provide noise control without the need for active monitoring and control of the multiple motor gearbox drive unit 700 while operating.

In some embodiments, both motors 716A, 716B in the multiple motor gearbox drive unit 700 may communicate accurate speed and position via one or more sensors (e.g., one or more rotary encoders, resolvers. This information may be received by an engine control unit ("ECU"). By way of example, the real-time position and speed of the teeth in each meshing may be received and interpreted by the ECU of a vehicle 100 as the motor drive units of the multiple motor gearbox drive unit 700 are operated. Using this information, the ECU may intentionally, and automatically, create an angular offset between the gear teeth meshings (e.g., while the motor drive units are operating), such that the noises generated by each motor drive unit will cancel each other out when combined in the common housing 770. Among other things, this strategy offers a dynamic tuning of the motor drive units in the multiple motor gearbox drive unit 700 to control emitted or generated noise 880, especially while the motor drive units are moving or operating.

It should be appreciated that the various control strategies described herein may be combined and/or used separately. For example, a multiple motor gearbox drive unit 700 may be preconfigured including the angular offset at manufacture and then later be controlled according to the dynamic tuning strategies described. This combined approach can allow the multiple motor gearbox drive unit 700 to maintain a synchronization in the angular offset and the corresponding mitigated noise even after assembly.

Figure 8A:
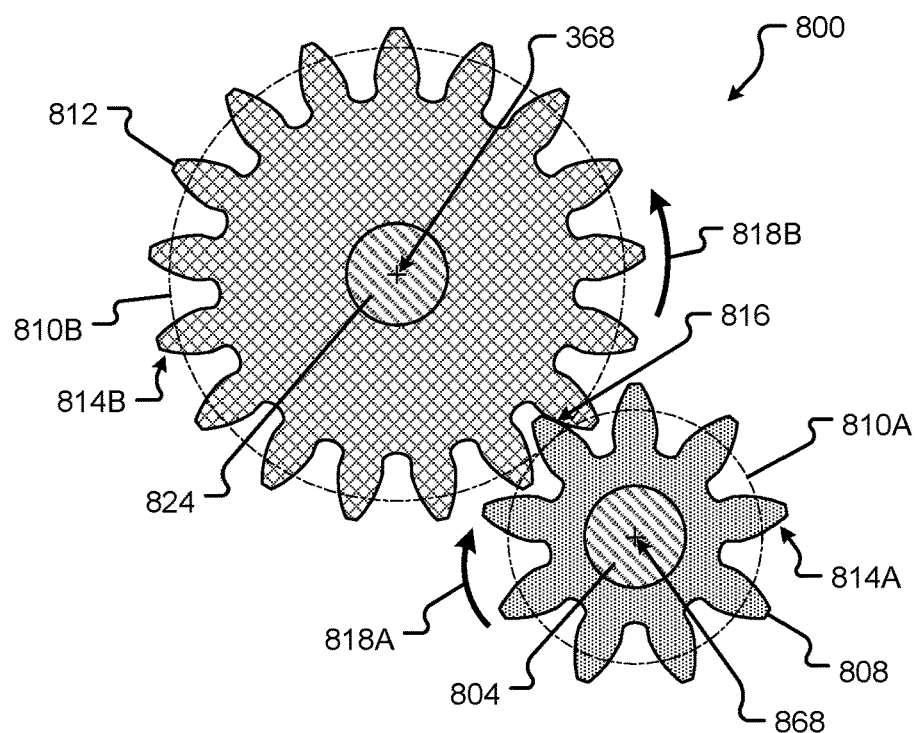
FIG. 8A shows a schematic section view of an engagement of a drive gear and intermediate driven gear in the multiple motor gearbox drive unit in accordance with embodiments of the present disclosure.

FIG. 8A shows a schematic section view of an engagement of a drive gear 808 and intermediate driven gear 812 in the multiple motor gearbox drive 700 unit in accordance with embodiments of the present disclosure. The drive gear 808 may correspond to one or more of the drive gears 708A, 708B shown and described in conjunction with FIGS. 7A-7F. The intermediate driven gear 812 may correspond to one or more of the intermediate driven gears 712A, 712B shown and described in conjunction with FIGS. 7A-7F. In some embodiments, the gears 808, 812 may be similar, if not identical, to the various transmission elements 732A, 732B, 740A, 740B described in conjunction with FIGS. 7A-7F. The drive gear 808 may include a number of drive gear teeth 814A disposed about a periphery of the drive gear 808 and around a drive motor axis 868 of a drive motor shaft 804. The driven gear 812 may include a number of driven gear teeth 814B disposed about a periphery of the driven gear 812 and around a driven gear, or output shaft, axis 368 of a driven gear shaft 824. It should be appreciated that any description provided in conjunction with the various motor gearbox drive units 500, 600, 700 including, but in no way limited to, the description of the general engagement of elements, transfer of energy and/or power, construction, arrangement of elements, housings, power output, couplings, etc., and/or the like, may equally apply to other multiple motor gearbox drive units described herein.

As shown in FIG. 8A, a gear set 800 (e.g., drive gear 808 and driven gear 812, etc.) of the multiple motor gearbox drive unit 700 may engage during operation, or as a gear tooth 814A of a drive gear 808 rotates (e.g., in a drive direction 818A about drive axis 868), contacts, and/or meshes with a corresponding gear tooth 814B of a driven gear 812 at an engagement point 816. The rotation and engagement of the drive gear 808 causes the driven gear 812 to rotate (e.g., in a driven direction 818B about the output shaft axis 368). In some embodiments, the drive gear 808 may include a drive gear pitch diameter 810A that coincides (e.g., tangentially at an engagement point 816) with a driven gear pitch diameter 810B

Figure 8B:
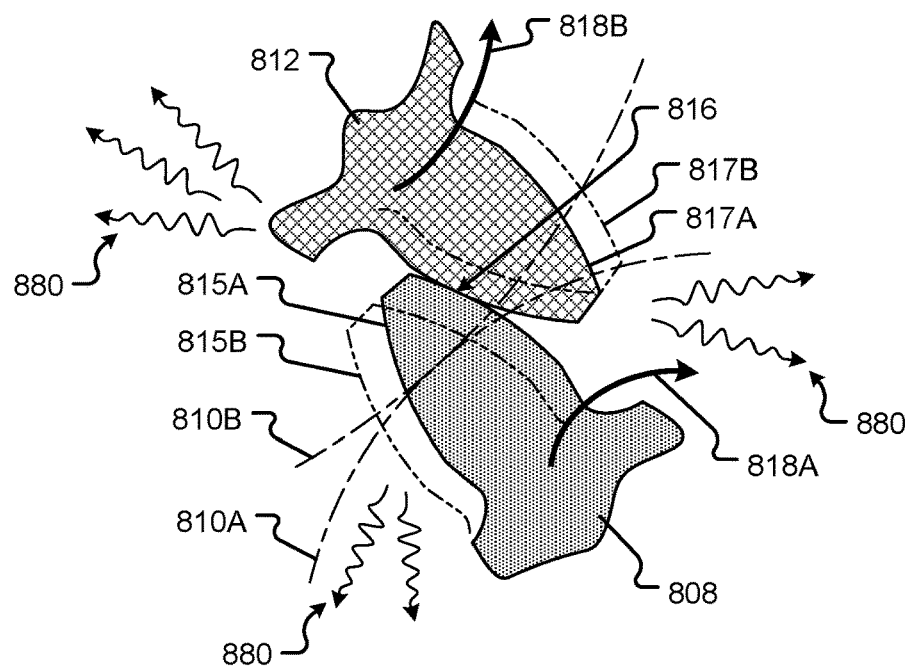
FIG. 8B shows a schematic detail section view of an engagement between teeth in the drive gear and intermediate driven gear of FIG. 8A.

FIG. 8B shows a schematic detail section view of an engagement between gear teeth in the drive gear 808 and intermediate driven gear 812 of FIG. 8A. As provided herein, noise 880 may be generated as the gear teeth 814A, 814B of the gear set 800 engage and disengage with one another during operation of the motors 716A, 716B in the multiple motor gearbox drive unit 700. For example, as the drive gear 808 rotates (e.g., in the drive direction 818A) a drive gear tooth 814A may contact a driven gear tooth 814B at an engagement point 816. At the point in time when the gear teeth 814A, 814B mesh, one of the drive gear teeth 814A may be in a first drive position 815A and a corresponding one of the driven gear teeth 814B may be in a first driven position 817A. In some cases, the inertia of the drive gear 808 upon contacting the driven gear 812 may cause the teeth 814A, 814B of the gears 808, 812 to chatter at the point of engagement 816. This chatter, or vibration, may result in moving the drive gear teeth 814A from a first drive position 815A to a second drive position 815B and/or the driven gear teeth 814B from a first driven position 817A to a second driven position 817B, respectively. In one embodiment, the engagement of a drive gear tooth 814A with a corresponding driven gear tooth 814B may cause a sliding friction between respective contacting surfaces of the teeth 814A, 814B.

In any event, the contact between the teeth 814A, 814B of the gears 808, 812 may generate noise 880 according to a predictable waveform (e.g., analog wave, sinusoidal wave, etc.). The waveform of the noise 880 may have varying sound intensities (e.g., amplitudes, etc.) at various contact times. For instance, the sound intensity may differ between when the gear teeth 814A, 814B are first engaged, transmitting force/power and moving relative to one another, when disengaged, and when the next teeth 814A, 814B in sequence are first engaged, etc. It is anticipated that this continual and repeated engagement, power transmission movement, and disengagement repeats according to a rotational cycle of the drive motors 716A, 716B in the multiple motor gearbox drive unit 700. As can be appreciated, the sound wave emitted from the gear set 800 may follow a cyclic intensity over time. In some embodiments, the noise intensity may be measured in decibels.

Figure 9A:
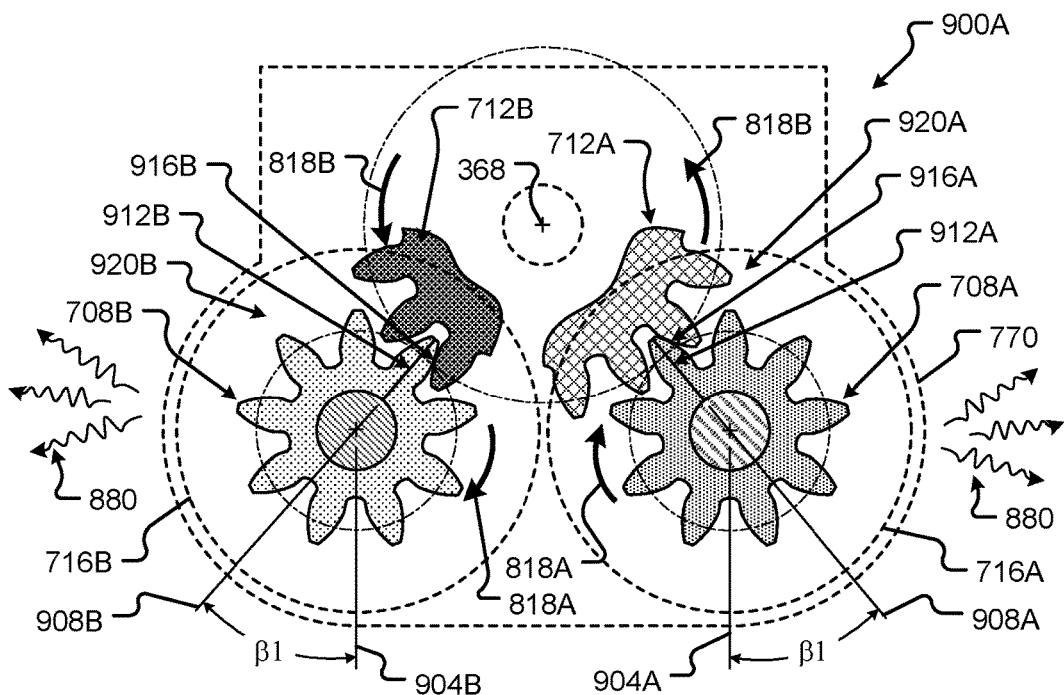
FIG. 9A shows a schematic section view of a first engagement state of first and second motor gear sets of the multiple motor gearbox drive unit in accordance with embodiments of the present disclosure.
Figure 9B:
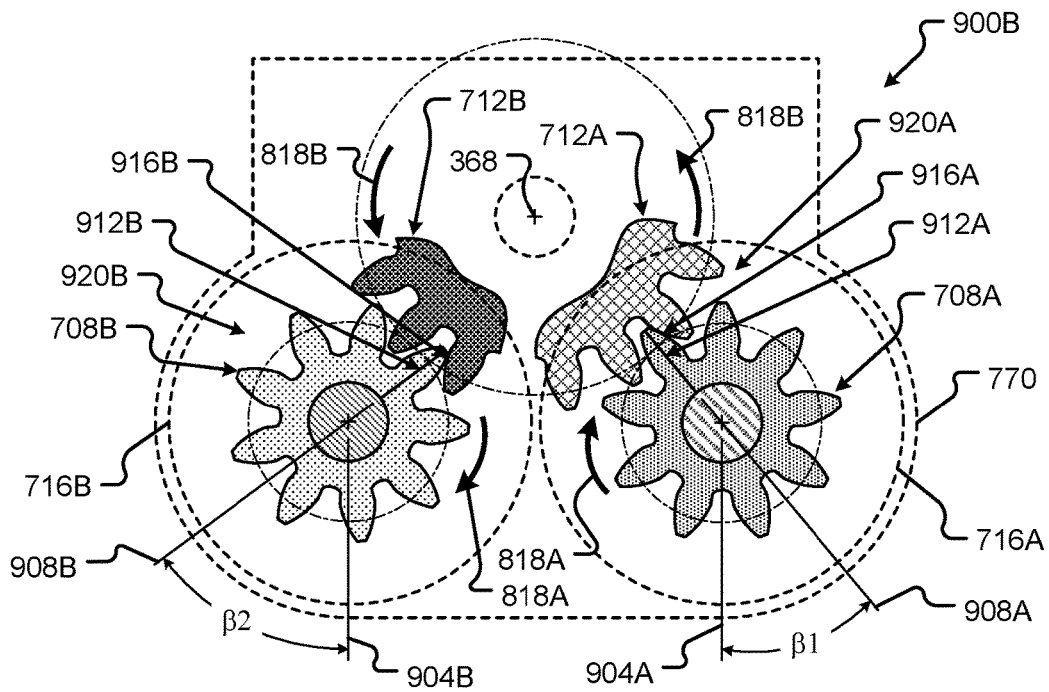
FIG. 9B shows a schematic section view of a second engagement state of first and second motor gear sets of the multiple motor gearbox drive unit in accordance with embodiments of the present disclosure.

FIGS. 9A-9B show schematic section views of different engagement states of first and second motor drive unit gear sets of the multiple motor gearbox drive unit 700 in accordance with embodiments of the present disclosure. Although shown in the same plane in FIGS. 9A and 9B, it should be appreciated, that the schematic views may represent sections taken from different points, or planes, in the multiple motor gearbox drive unit 700. For instance, the right-hand side of each view shown (e.g., first gear set 920A) may represent a broken section taken through the first drive gear 708A and the first intermediate driven gear 712A. As another example, the left-hand side of each view shown (e.g., second gear set 920B) may represent a broken section taken through the second drive gear 708B and the second intermediate driven gear 712B. Among other things, the broken section views of each gear set 920A, 920B are shown to illustrate a relative angular position of each drive gear 708A, 708B to one another and/or to their respective intermediate driven gears 712A, 712B. In some embodiments, the first and second gear sets 920A, 920B may correspond to the gear set 800 described in conjunction with FIGS. 8A-8B.

In some embodiments, the angular position of a drive gear 708A, 708B, and/or a stator position of a particular motor 716A, 716B, in the multiple motor gearbox drive unit 700 may be measured from a common datum. For instance, FIGS. 9A-9B show the angular position of the drive gears 708A, 708B measured from a vertical plane running through the multiple motor gearbox drive unit 700. While this vertical plane (e.g., running parallel to the common output axis 368 into, or out of, the page, etc.) may represent the common datum of measurement for the angular position of the drive gears 708A, 708B, for the sake of convenience, the first datum plane 904A may be associated with the first gear set 920A and a second datum plane 904B may be associated with the second gear set 920B. However, it should be appreciated that according to geometric principles, the angle measured between a first gear position indicator 912A and either datum plane 904A, 904B will be the same. Further, although these datum planes 904A, 904B are shown separately, it should be appreciated that the datum plane references may in fact be referring to the same vertical reference datum plane (e.g., a vertical plane running into the page, perpendicular to the base of the multiple motor gearbox drive unit 700, and parallel to the output axis 368).

The gear sets 920A, 920B may be synchronized with one another in the first state 900A and/or in the second state 900B shown in FIGS. 9A and 9B. For example, the rotational drive direction 818A of each drive gear 708A, 708B may be controlled (e.g., by an ECU, VCU, MCU, etc.) to move together and in synchronization with one another. In this example, where the movement is synchronized, the angular position of the first gear set 920A may be maintained relative to the angular position of the second gear set 920B over time, whether the angular measurement is the same for each gear set 920A, 920B or different for each gear set 920A, 920B. This synchronization ensures that each drive gear 708A, 708B maintains the set, or controlled, angular position as the gears 708A, 708B are operated, or rotated, over time.

Each drive gear 708A, 708B includes a gear position indicator 912A, 912B that represents a point, plane, or other reference feature and that identifies a known orientation, position, and/or feature of each drive gear 708A, 708B in the multiple motor gearbox drive unit 700. The first gear position indicator 912A and the second gear position indicator 912B are located at a position of their respective drive gear 708A, 708B such that the drive gears 708A, 708B may be exchanged such that the known orientations, positions, and/or features measured from these gear position indicators 912A, 912B produce the same, or substantially similar, angular measurement. For instance, the first and second gear position indicators 912A, 912B may both be disposed in the center of a drive tooth of the drive gear 708A, 708B.

Additionally or alternatively, the gear sets 920A, 920B may each include a first and second gear engagement point 916A, 916B, respectively. In some embodiments, the gear position indicators 912A, 912B may be associated with an engaging tooth in a particular drive gear 708A, 708B. In one embodiment, the gear position indicators 912A, 912B may be virtual in that they always represent a particular point on an engaging element (e.g., tooth, etc.) of a drive gear 708A, 708B.

Referring to FIG. 9A, a first schematic broken section view of a first engagement state 900A of the first and second motor gear sets 920A, 920B of the multiple motor gearbox drive unit 700 is shown in accordance with embodiments of the present disclosure. The first engagement state 900A may refer to the relative positions of drive engagement elements at a point in time taken during the operation of the multiple motor gearbox drive unit 700. In the first engagement state 900A, the first drive gear 708A has the same angular position measurement, $\beta1$, as the second drive gear 708B. For example, the angle, $\beta1$, of the engaging drive element of the first drive gear 708A relative to the first datum plane 904A is the same as the angle, $\beta1$, of the engaging drive element of the second drive gear 708B relative to the first and/or second datum plane 904A, 904B. As shown in FIG. 9A, the engaging elements of each drive gear 708A, 708B are contacting their respective driven gears 712A, 712B at the same point and angle. In this state a particular noise 880 (e.g., noise sound wave) may be emitted from the multiple motor gearbox drive unit 700 (e.g., from a shared or common housing 770 of the unit, or some other component, etc.).

In FIG. 9A, where the angular position measurement, $\beta1$, is the same for the first and second drive gear 708A, 708B, the noise 880, or sound wave emitted, from the shared housing 770 of the multiple motor gearbox drive unit 700 may be the combination of a first noise sound wave generated by the first motor drive unit (e.g., the first motor 716A and first drive gear 708A meshing with the first intermediate driven gear 712A) and a second noise sound wave generated by the second motor drive unit (e.g., the second motor 716B and second drive gear 708B meshing with the second intermediate driven gear 712B). In some embodiments, the first and second noise sound waves generated by the first and second gear sets 920A, 920B may be substantially similar, if not identical, to one another (e.g., having the same, or similar, frequencies, amplitudes, wavelengths, cycles, etc.). When the angular position measurement, $\beta 1$, of the drive gears 708A, 708B in each gear set 920A, 920B is the same, these sound waves (e.g., sinusoidal waveforms, etc.) may coincide with one another (e.g., where the crest, or peak, of the first sound wave coincides with the crest, or peak, of the second sound wave, etc.) creating an amplified sound or noise 880 emitted from the common housing 770 as the motors 716A, 716B are operated.

FIG. 9B shows a schematic broken section view of a second engagement state 900B of first and second motor gear sets 920A, 920B of the multiple motor gearbox drive unit 700 in accordance with embodiments of the present disclosure. The second engagement state 900B may refer to the relative positions of drive engagement elements at a point in time taken during the operation of the multiple motor gearbox drive unit 700. In the second engagement state 900B, the first drive gear 708A has an angular position measurement, $\beta 1$, which is different from the angular position measurement, $\beta 2$, of the second drive gear 708B. For example, the angle, $\beta 1$, of the engaging drive element of the first drive gear 708A relative to the first datum plane 904A is different from the angle, $\beta 2$, of the engaging drive element of the second drive gear 708B relative to the first and/or second datum plane 904A, 904B. As shown in FIG. 9B, the engaging elements of each drive gear 708A, 708B are contacting their respective driven gears 712A, 712B at different points and angles. In this second state 904B the noise 880 (e.g., noise sound wave) emitted from the multiple motor gearbox drive unit 700 may be mitigated, reduced, and/or completely eliminated, or canceled.

As provided above, the first and second noise sound waves generated by the first and second gear sets 920A, 920B may be substantially similar, if not identical, to one another (e.g., having the same, or similar, frequencies, amplitudes, wavelengths, cycles, etc.). When the angular position measurement, $\beta 1$, is the same for the first and second drive gear 708A, 708B, the noise 880, or sound wave emitted, from the shared housing 770 of the multiple motor gearbox drive unit 700 may create an amplified sound or noise 880 emitted from the common housing 770 as the motors 716A, 716B are operated. It is an aspect of the present disclosure, however, that the angular position between drive elements may be altered, changed, and/or controlled (e.g., by an ECU, VCU, MCU, etc.) to be different. When the angular positions are different, the first noise sound wave generated by the first motor drive unit (e.g., the first motor 716A and first drive gear 708A meshing with the first intermediate driven gear 712A) and the second noise sound wave generated by the second motor drive unit (e.g., the second motor 716B and second drive gear 708B meshing with the second intermediate driven gear 712B) may be offset or shifted by a known phase angle. In some embodiments, When the angular position measurement, $\beta 1$, of the first drive gear 708A is controlled to be different from the angular position measurement, $\beta 2$, of the second gear 708B, the sinusoidal sound waves emitted from each gear set 920A, 920B may be shifted such that they do not coincide with one another (e.g., where the crest, or peak, of the first sound wave is offset, or shifted, from the crest, or peak, of the second sound wave, etc.). In some embodiments, the angular position of the first drive gear 708A may be altered relative to the angular position of the second drive gear 708B until the sound waves of the first and second gear sets 920A, 920B are shifted 180 degrees cancelling each other (e.g., eliminating any cumulative noise 880 emitted from the common housing 770). FIG. 11 describes this shifting of sound wave phase angles in greater detail. In some embodiments, the angular position of the drive gears 708A, 708B and/or the sound emitted from each gear set 920A, 920B may be dynamically monitored (e.g., via one or more sensors, resolvers, microphones, transducers, etc.) and interpreted via a controller (e.g., ECU, VCU, MCU, etc.) in actively controlling angular positions of one or more of the drive gears 708A, 708B via a motor 716A, 716B control. Control elements, systems, and methods are described in greater detail in conjunction with FIGS. 10, and 12-14.

Figure 10:
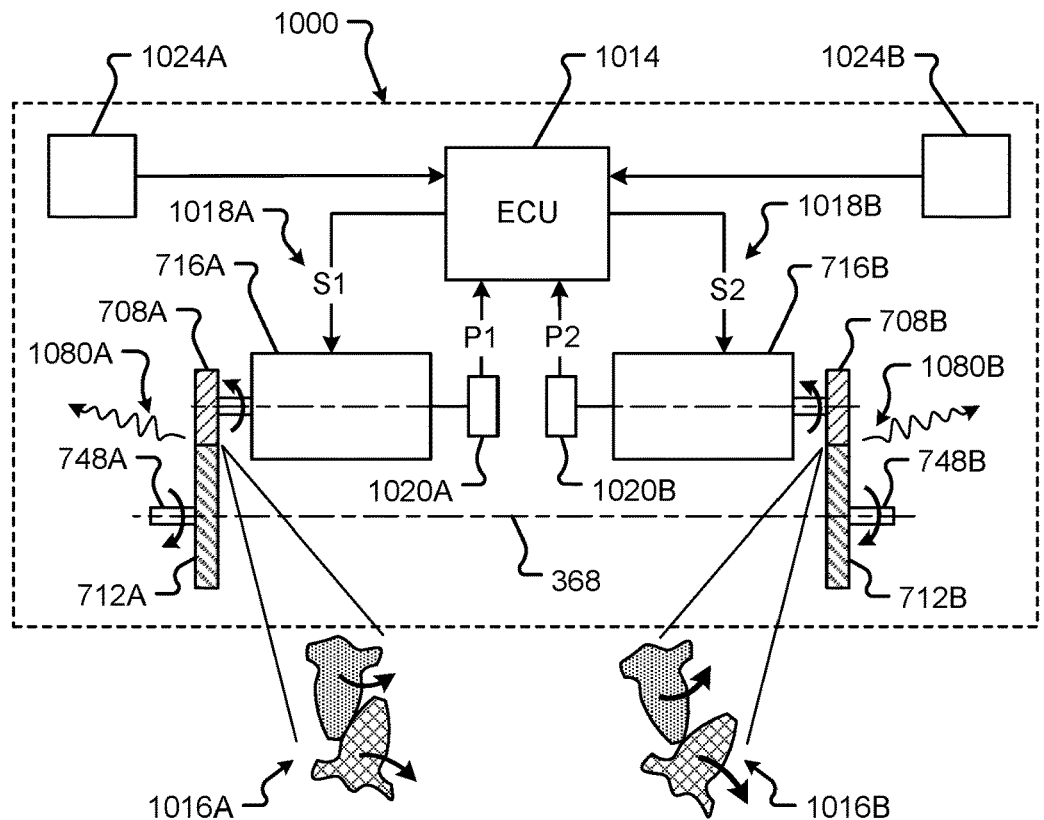
FIG. 10 is a block diagram of a motor drive unit control system of the vehicle in accordance with embodiments of the present disclosure.
Figure 11:
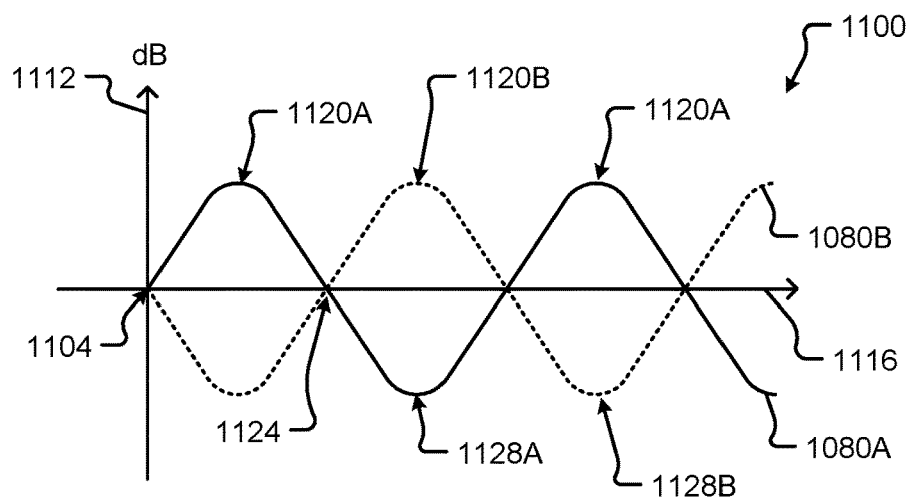
FIG. 11 shows a graphical representation of opposing noise sound waves from controlled motors in the multiple motor gearbox drive unit in accordance with embodiments of the present disclosure.

FIG. 10 is a block diagram of a motor drive unit control system 1000 of the vehicle 100 in accordance with embodiments of the present disclosure. The motor drive unit control system 1000 may include an ECU 1014, a first position sensor 1020A, a second position sensor 1020B, a first noise sensor 1024A, a second noise sensor 1024B, and a multiple motor gearbox drive unit 700 comprising a first drive motor 716A and a second independently controlled drive motor 716B and associated drive elements. As shown in FIG. 10, the first and second drive gears 708A, 708B of the respective independent motors 716A, 716B may be controlled via control signals 1018A, 1018B emitted from the ECU 1014 to alter, control, and/or maintain angular positions of gears 1016A, 1016B.

The ECU 1014 may correspond to the power controller 214 described in conjunction with FIGS. 2 and 3, the computer system 400 or processors 408 described in conjunction with FIG. 4, and/or a VCU, MCU, other motor controller or portion thereof, and/or the like. The position sensors 1020A, 1020B may be associated with first and second motors 716A, 716B. In some embodiments, the position sensors 1020A, 1020B may be configured as an encoder, a resolver, a proximity sensor, and/or some other position detection sensor. In any event, the position sensors 1020A, 1020B may determine, or detect, an angular position of the drive gears 708A, 708B at any time. For instance, the first position sensor 1020A may determine, or detect, a position of the various components of the first motor 716A including, but not limited to, the motor stator and/or the first drive gear 708A. Additionally or alternatively, the second position sensor 1020B may determine, or detect, a position of the various components of the second motor 716B including, but not limited to, the motor stator and/or the second drive gear 708B. The position sensors 1020A, 1020B may be configured to report, or send, the angular position, P1, of the first drive gear 708A to the ECU 1014 and the angular position, P2, of the second drive gear 708B to the ECU 1014. The angular positions, P1, P2, may be detected at the same time, and may even be sent to the ECU 1014 at the same time (e.g., concurrently with one another, etc.). Based on the angular positions, P1, P2, received, the ECU 1014 may send independent control signals 1018A, 1018B (e.g., S1, S2) to the first and second motors 716A, 716B to control the angular positions of the drive gears 708A, 708B as described herein. While the control signals 1018A, 1018B may independently control the angular positions of the drive gears 708A, 708B of respective motors 716A, 716B, it should be appreciated that the relative angular positions may be maintained in a synchronized fashion by the ECU 1014.

Examples of the noise sensors 1024A, 1024B may include, but are in no way limited to, microphones, pressure transducers, strain gauges, sound transducer, etc., and/or other sensors capable of converting received, or detected, sound wave energy into an electrical signal. In some embodiments, a first noise sensor 1024A may be disposed adjacent to a first motor drive unit (e.g., first motor 716A, first drive gear 708A, and first intermediate driven gear 712A, etc.) of the multiple motor gearbox drive unit 700. The first noise sensor 1024A may detect a first noise sound wave 1080A generated by the first motor drive unit (e.g., the first motor 716A and first drive gear 708A meshing with the first intermediate driven gear 712A). In response, the first noise sensor 1024A may send a signal of the detected first noise sound wave 1080A to the ECU 1014. In one embodiment, a second noise sensor 1024B may be disposed adjacent to a second motor drive unit (e.g., second motor 716B, second drive gear 708B, and second intermediate driven gear 712B, etc.) of the multiple motor gearbox drive unit 700. The second noise sensor 1024B may detect a second noise sound wave 1080B generated by the second motor drive unit (e.g., the second motor 716B and second drive gear 708B meshing with the second intermediate driven gear 712B). In response, the second noise sensor 1024B may send a signal of the detected second noise sound wave 1080B to the ECU 1014. It is an aspect of the present disclosure that the first and second noise sound waves 1024A, 1024B may be detected at the same time, and may even be sent to the ECU 1014 at the same time (e.g., concurrently with one another, etc.).

FIG. 11 shows a graphical representation of opposing first and second noise sound waves 1080A, 1080B from controlled motors 716A, 716B in the multiple motor gearbox drive unit 700 in accordance with embodiments of the present disclosure. The graphical representation shows intensities of the first and second noise sound waves 1080A, 1080B over time. For example, the first and second noise sound waves 1080A, 1080B are shown on a graph 1100 displaying noise intensity (e.g., in decibels) along the vertical or y-axis 1112 and time (e.g., in seconds, fractions of seconds, etc.) along the horizontal or x-axis 1116. The horizontal axis 1116 may cross the vertical axis at a predetermined noise intensity level. As shown in FIG. 11, the first noise sound wave 1080A is shown as an analog waveform (e.g., sinusoidal waveform, etc.) oscillating as the first motor 716A is operated (e.g., over the time period shown, etc.). The first noise sound wave 1080A is measured from an origin 1104 increasing in noise intensity as time passes to a first peak level 1120A in noise intensity then decreasing in noise intensity until it crosses the predetermined noise intensity level represented by the horizontal axis 1116. The first noise sound wave 1080A continues along its cycle until it reaches a trough intensity, or lowest noise intensity level, 1128A and returns to the predetermined noise intensity level represented by the horizontal axis 1116 completing a cycle of the first noise sound wave 1080A. The cycle of the first noise sound wave 1080A may correspond to the noise generated as the first drive gear 708A meshes with and transmits power to a first intermediate driven gear 712A (e.g., via one or more engaging and disengaging teeth).

The second noise sound wave 1080B shown in the graph 1100 may be measured from the origin 1104 decreasing in noise intensity as time passes to a trough intensity, or lowest noise intensity level, 1128B then increasing in noise intensity until it crosses the predetermined noise intensity level represented by the horizontal axis 1116. The first noise sound wave 1080A continues along its cycle until it reaches a peak level 1120B in noise intensity and returns to the predetermined noise intensity level represented by the horizontal axis 1116 completing a cycle of the second noise sound wave 1080B. The cycle of the second noise sound wave 1080B may correspond to the noise generated as the second drive gear 708A meshes with and transmits power to a second intermediate driven gear 712B (e.g., via one or more engaging and disengaging teeth). As shown in FIG. 11, and as described above, the first and second noise sound waves 1080A, 1080B are substantially similar waveforms (e.g., having the same, or similar, frequencies, amplitudes, wavelengths, cycles, etc.) as they each represent a noise signal from meshing drive gears 708A, 708B and intermediate gears 712A, 712B. However, as shown in FIG. 11, the first and second noise sound waves 1080A, 1080B have been shifted by 180 degrees such that the peak 1120A of the first noise sound wave 1080A coincides with the trough 1128B of the second noise sound wave 1080B. When combined, these 180-degree phase angle shifted noise sound waves 1080A, 1080B may provide a mitigated or cancelled cumulative noise sound wave output from the multiple motor gearbox drive unit 700.

Figure 12:
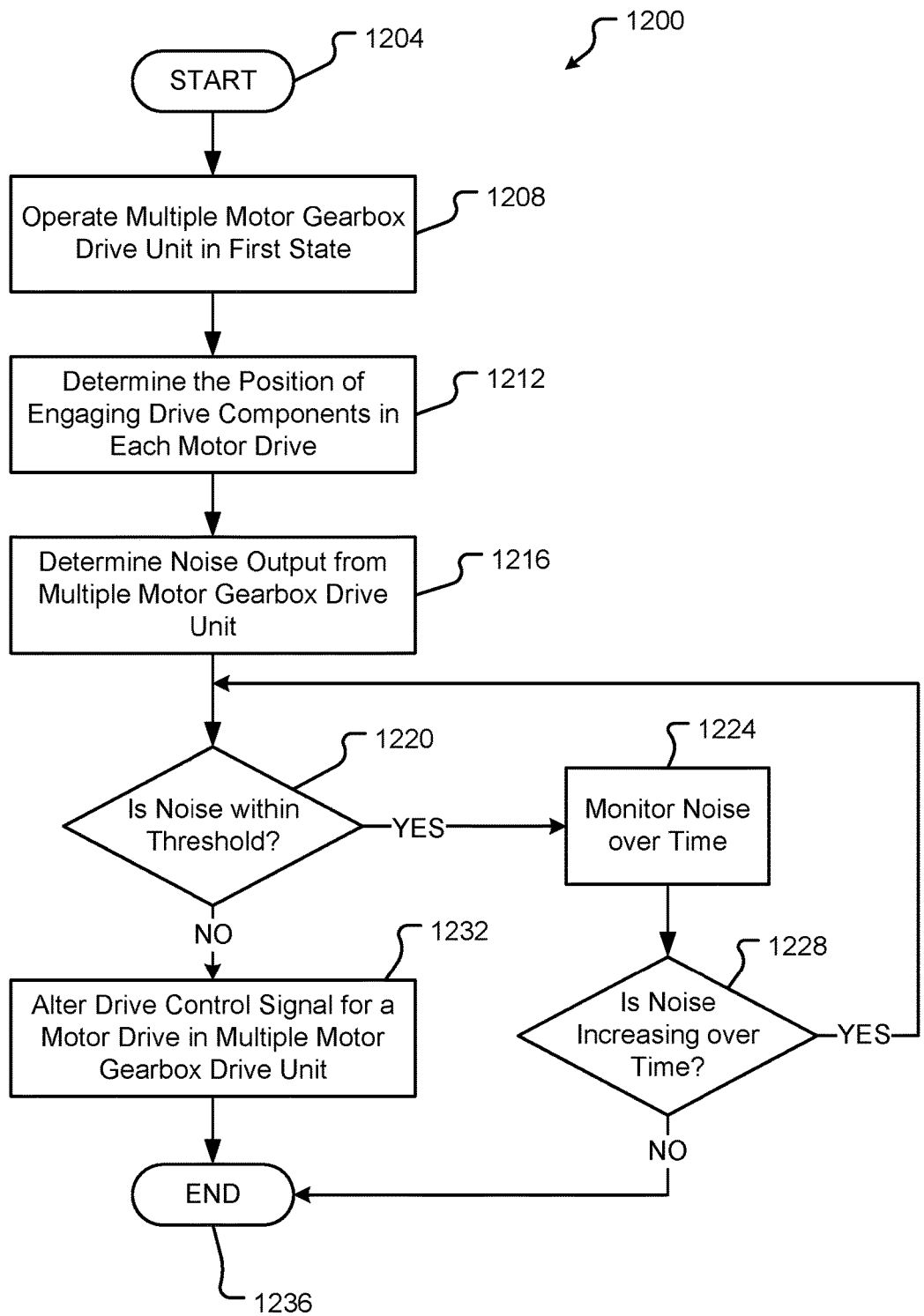
FIG. 12 is a flow diagram of a first method for controlling noise in a multiple motor gearbox drive unit in accordance with embodiments of the present disclosure.

FIG. 12 is a flow diagram of a first method 1200 for controlling noise in a multiple motor gearbox drive unit 700 in accordance with embodiments of the present disclosure. While a general order for the steps of the method 1200 is shown in FIG. 12, the method 1200 can include more or fewer steps or can arrange the order of the steps differently than those shown in FIG. 12. Generally, the method 1200 starts with a start operation 1204 and ends with an end operation 1236. The method 1200 can be executed as a set of computer-executable instructions executed by a computer system and encoded or stored on a computer readable medium (e.g., the power controller 214, computer system 400, ECU 1014, etc.). Hereinafter, the method 1200 shall be explained with reference to the systems, components, assemblies, devices, user interfaces, environments, software, etc. described in conjunction with FIGS. 1-11.

The method 1200 begins at step 1204 and proceeds by operating the multiple motor gearbox drive unit 700 in a first state (step 1208). In some embodiments, both motors 716A, 716B of the multiple motor gearbox drive unit 700 may be operated at a first time. In this case, each motor 716A, 716B and drive gear 708A, 708B may be moving or rotating. In one embodiment, the multiple motor gearbox drive unit 700 may be operated at assembly of the multiple motor gearbox drive unit 700, assembly of the multiple motor gearbox drive unit 700 in the vehicle 100, and/or while the vehicle 100 including a multiple motor gearbox drive unit 700 is being driven or otherwise operated.

Next, the method 1200 continues by determining the position of engaging drive elements and/or components in each motor drive unit of the multiple motor gearbox drive unit 700 (step 1212). The engaging drive elements may refer to the drive gear 708A, 708B of each motor drive unit (e.g., motor 716A, 716B, drive gear 708A, 708B, and/or other gears) in the multiple motor gearbox drive unit 700. As described in conjunction with FIGS. 7F-9B, and 10, the position of each drive gear 708A, 708B may be determined via a resolver, rotary encoder, or other position sensor 1020A, 1020B in communication with the ECU 1014.

The method 1200 proceeds by determining the noise output from the multiple motor gearbox drive unit 700 (step 1216). In some embodiments, the noise output may be detected by one or more noise sensors 1024A, 1024B associated with the motor drive unit control system 1000 and described in conjunction with FIG. 10. In one embodiment, the first and second noise sound waves 1080A, 1080B may be independently detected and sent to the ECU 1014. At the ECU 1014, the first and second noise sound waves 1080A, 1080B may be combined to form a cumulative noise sound wave. The cumulative noise sound wave may correspond to a combined sound wave emitted by a common housing 770 of the multiple motor gearbox drive unit 700.

The ECU 1014 may determine whether the first and second noise sound waves 1080A, 1080B and/or the cumulative noise sound wave is within a predetermined acceptable noise threshold (step 1220). The predetermined acceptable noise threshold may correspond to a maximum noise intensity level for the multiple motor gearbox drive unit 700. In some embodiments, the maximum noise intensity level may be measured in decibels. If the determined noise output is within the predetermined acceptable noise threshold, the method 1200 may continue to monitor the noise output from the multiple motor gearbox drive unit 700 over time (step 1224). In the event that the noise increases over time, the method 1200 may return to step 1220.

If, at step 1220, it is determined that the noise output from the multiple motor gearbox drive unit 700 is not within the predetermined acceptable noise threshold, the method 1200 may proceed by altering a drive control signal for at least one of the motors 716A, 716B in the multiple motor gearbox drive unit 700 (step 1232). Altering the drive control signal may include the ECU 1014 sending a control signal 1018A, 1018B to one, or both, motors 716A, 716B. The control signal 1018A, 1018B may be configured to alter an angular position of the first drive gear 708A relative to the angular position of the second drive gear 708B. This altered relative angular position may shift, by a phase angle, the first noise sound wave 1080A from the second noise sound wave 1080B. In some embodiments, the method 1200 may proceed to step 1224 or end at step 1236.

Figure 13:
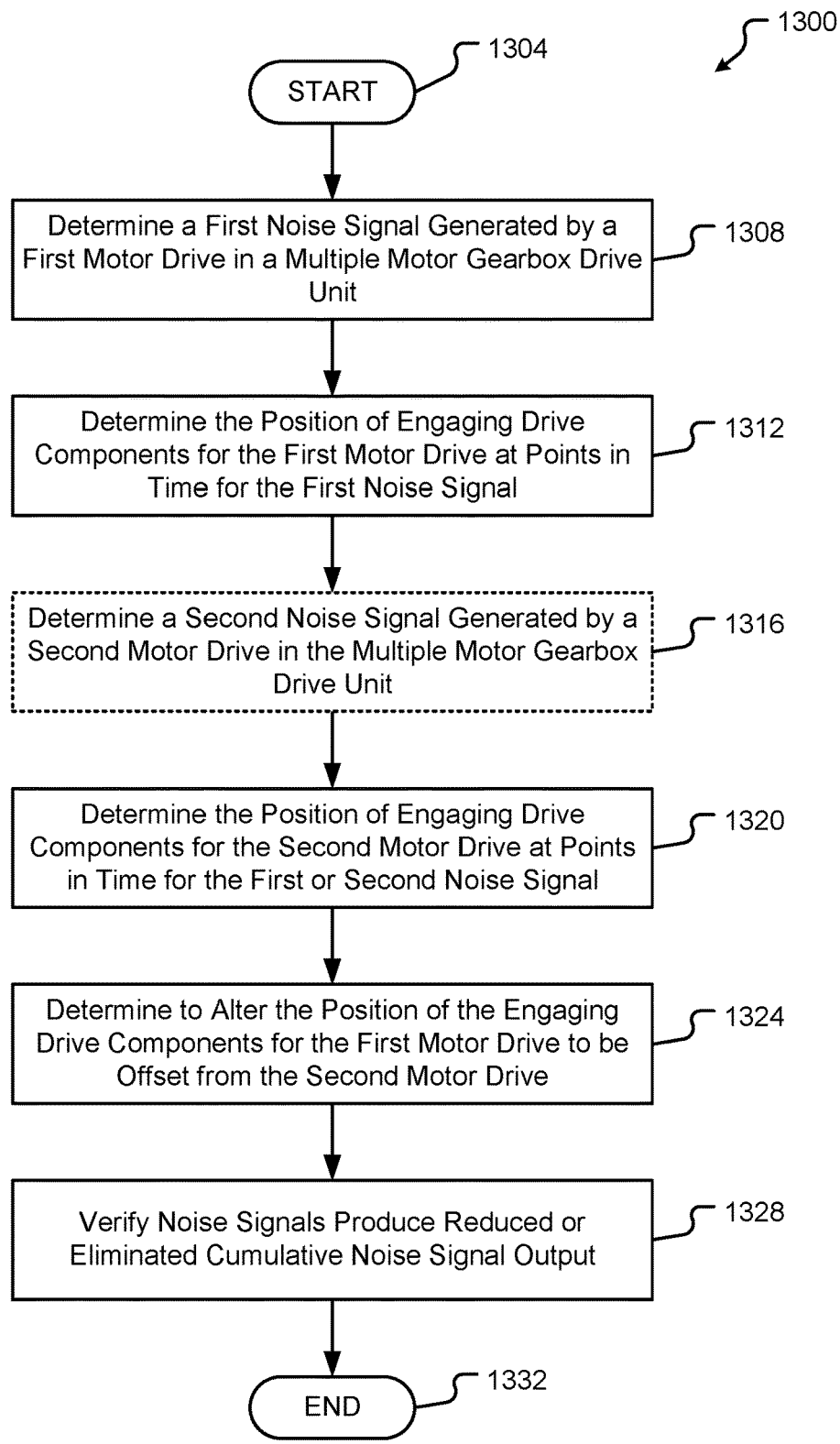
FIG. 13 is a flow diagram of a second method for controlling noise in a multiple motor gearbox drive unit in accordance with embodiments of the present disclosure.

FIG. 13 is a flow diagram of a second method 1300 for controlling noise in a multiple motor gearbox drive unit 700 in accordance with embodiments of the present disclosure. While a general order for the steps of the method 1300 is shown in FIG. 13, the method 1300 can include more or fewer steps or can arrange the order of the steps differently than those shown in FIG. 13. Generally, the method 1300 starts with a start operation 1304 and ends with an end operation 1332. The method 1300 can be executed as a set of computer-executable instructions executed by a computer system and encoded or stored on a computer readable medium (e.g., the power controller 214, computer system 400, ECU 1014, etc.). Hereinafter, the method 1300 shall be explained with reference to the systems, components, assemblies, devices, user interfaces, environments, software, etc. described in conjunction with FIGS. 1-12.

The method 1300 begins at step 1304 and proceeds by determining a first noise sound wave, or signal, 1080A generated by a first motor drive unit (e.g., a first motor 716A, first drive gear 708A, and a first intermediate driven gear 712A) in the multiple motor gearbox drive unit 700 at a first time (step 1308). The first noise sound wave, or signal, 1080A may be detected via one or more sensors 1024A, microphones, and/or transducers associated with the motor drive unit control system 1000. In some embodiments, the first noise sound wave 1080A is detected at a time that the first motor 716A is operated (e.g., rotating, moving, etc.).

Next, the method 1300 may determine a position of the engaging drive components for the first motor drive unit at one or more points in time for the first noise sound wave 1080A. In one embodiment, the first position sensor 1020A, associated with first motor 716A may determine, or detect, an angular position of the first drive gear 708A over a time period. In some embodiments, the first position sensor 1020A may be configured as an encoder, a resolver, a proximity sensor, and/or some other position detection sensor. For instance, the first position sensor 1020A may determine, or detect, a position of the various components of the first motor 716A including, but not limited to, the motor stator and/or the first drive gear 708A. The first position sensor 1020A may be configured to report, or send, the angular position, P1, of the first drive gear 708A to the ECU 1014. The ECU 1014 may receive the first sound wave 1080A, detected via the sensor 1024A over time and correlate the points along the first noise sound wave 1080A, and/or the phase of the first noise sound wave 1080A to the angular position of the first drive gear 708A received over the same time.

In some embodiments, the method 1300 may optionally continue by determining a second noise sound wave, or signal, 1080B generated by a second motor drive unit (e.g., a second motor 716B, second drive gear 708B, and a second intermediate driven gear 712B) in the multiple motor gearbox drive unit 700 (step 1316). In some cases, this second noise sound wave 1080B may be determined at the same time the first noise sound wave 1080A is determined. In any event, the second noise sound wave, or signal, 1080B may be detected via one or more sensors 1024B, microphones, and/or transducers associated with the motor drive unit control system 1000. In some embodiments, the second noise sound wave 1080B is detected at a time that the first and/or second motor 716A, 716B are operated (e.g., rotating, moving, etc.).

The method 1300 continues by determining a position of the engaging drive components for the second motor drive unit at one or more points in time for the first and/or second noise sound wave 1080A, 1080B (step 1320). In one embodiment, the second position sensor 1020B, associated with second motor 716B may determine, or detect, an angular position of the second drive gear 708B over a time period. In some embodiments, the second position sensor 1020B may be configured as an encoder, a resolver, a proximity sensor, and/or some other position detection sensor. For instance, the second position sensor 1020B may determine, or detect, a position of the various components of the second motor 716B including, but not limited to, the motor stator and/or the second drive gear 708B. The second position sensor 1020B may be configured to report, or send, the angular position of the second drive gear 708A to the ECU 1014. The ECU 1014 may receive the first sound wave 1080A, detected via the sensor 1024B over time and correlate the points along the first and/or second noise sound wave 1080A, 1080B, and/or the phase of the first and/or second noise sound wave 1080A, 1080B to the angular position of the second drive gear 708B received over the same time.

Based on the relative angular positions, the method 1300 may proceed by determining to alter the position of the engaging drive components for the first motor drive to be offset from the position of the second motor drive to mitigate the noise output from the multiple motor gearbox drive unit (step 1324). In the event that the engaging drive components for the first and second drive units, e.g., the first and second drive gears 708A, 708B, have the same angular position (e.g., similar, if not identical, to the gear sets 920A, 920B shown in the first engagement state 900A of FIG. 9A) the ECU 1014 may determine to alter a position of the first motor drive relative to the second motor drive. In this case, the ECU 1014 may send a control signal 1018A to the first motor 716A to change the angular position of the first drive gear 708A. Additionally or alternatively, the ECU 1014 may send a control signal 1018B to the second motor 716B to change the angular position of the second drive gear 708B. In any event, the ECU 1014 may change the angular position of one drive gear relative to another (e.g., the first drive gear 708A relative to the second drive gear 708B).

The method 1300 may continue by verifying that the noise signals produce a reduced, or eliminated, cumulative noise signal output (step 1328). In some embodiments, this reduced or eliminated, cumulative noise signal output may be measured against a combination of the first and second noise sound waves 1080A, 1080B measured at the first time. In one embodiment, the ECU 1014 may determine whether the first and second noise sound waves 1080A, 1080B and/or the cumulative noise sound wave is within a predetermined acceptable noise threshold. The predetermined acceptable noise threshold may correspond to a maximum noise intensity level for the multiple motor gearbox drive unit 700. In some embodiments, the maximum noise intensity level may be measured in decibels. If the determined noise output is within the predetermined acceptable noise threshold, the method 1300 may end at step 1332. Otherwise, the method 1300 may return to step 1324 to alter the position of the engaging drive components for the first motor drive unit to be further offset from the second motor drive unit.

Figure 14:
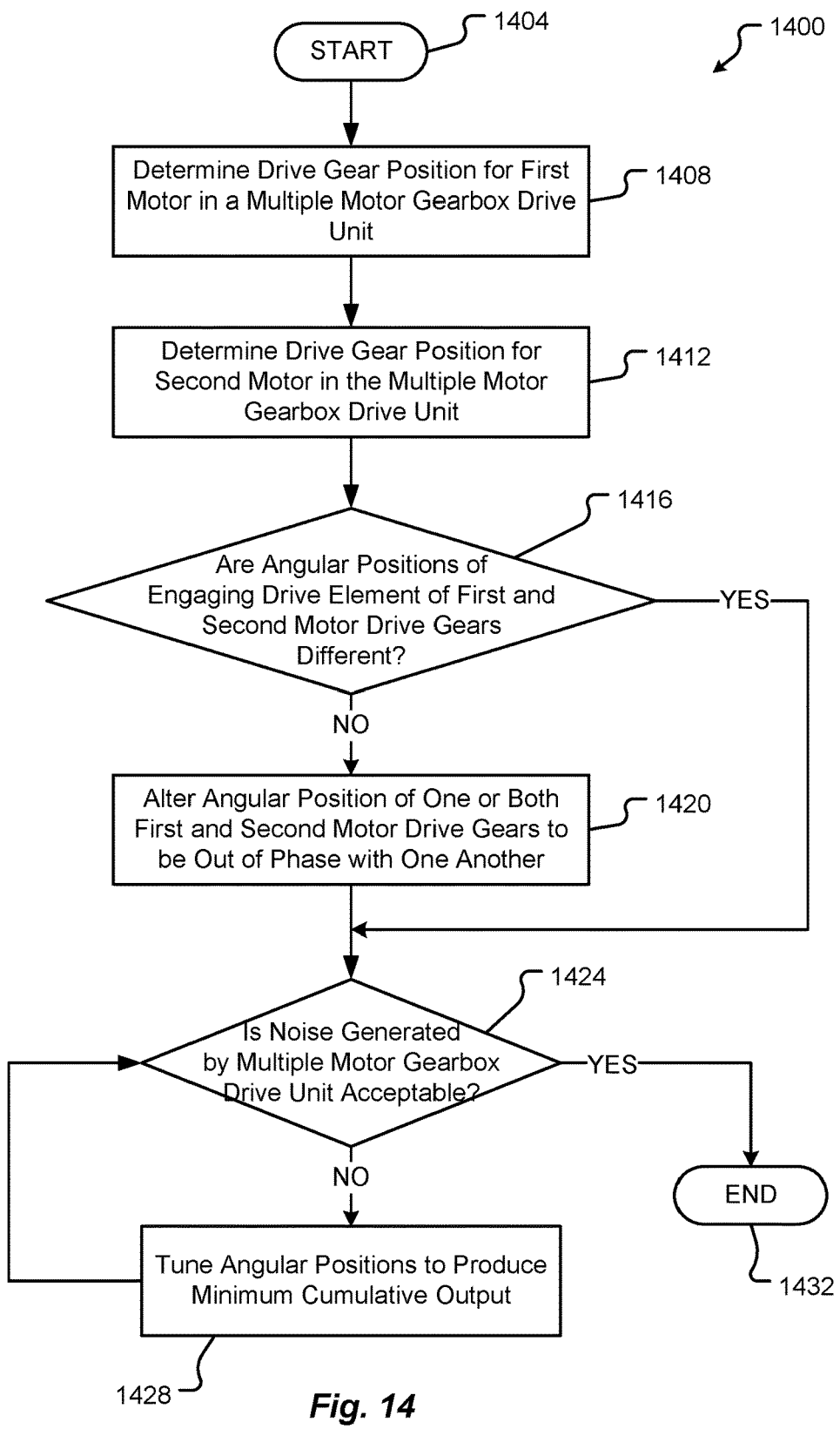
FIG. 14 is a flow diagram of a third method for controlling noise in a multiple motor gearbox drive unit in accordance with embodiments of the present disclosure.

Referring now to FIG. 14, a flow diagram of a third method 1400 for controlling noise in a multiple motor gearbox drive unit 700 is shown in accordance with embodiments of the present disclosure. While a general order for the steps of the method 1400 is shown in FIG. 14, the method 1400 can include more or fewer steps or can arrange the order of the steps differently than those shown in FIG. 14. Generally, the method 1400 starts with a start operation 1404 and ends with an end operation 1432. The method 1400 can be executed as a set of computer-executable instructions executed by a computer system and encoded or stored on a computer readable medium (e.g., the power controller 214, computer system 400, ECU 1014, etc.). Hereinafter, the method 1400 shall be explained with reference to the systems, components, assemblies, devices, user interfaces, environments, software, etc. described in conjunction with FIGS. 1-13.

The method 1400 begins at step 1404 and proceeds by determining the position of the first drive gear 708A in the multiple motor gearbox drive unit 700 (step 1408). The position of the first drive gear 708A may correspond to the angular position for the first drive gear 708A as described above. Additionally or alternatively, determining the position of the first drive gear 708A may correspond to the determination of the angular position of the first drive gear 708A as previously described.

Next, the method 1400 determines the second drive gear 708B position for the second motor drive unit in the multiple motor gearbox drive unit 700 (step 1412). The position of the second drive gear 708A may correspond to the angular position for the second drive gear 708B as described above. Additionally or alternatively, determining the position of the second drive gear 708B may correspond to the determination of the angular position of the second drive gear 708B as previously described.

In some embodiments, the method 1400 may proceed by determining whether the angular positions of the first drive gear 708A and the second drive gear 708B are different (step 1416). For example, the ECU 1014 may determine whether the angular position measurement for the first drive gear 708A relative to a reference datum, in angles, is different from the angular position measurement for the second drive gear 708B relative to the reference datum.

In the event that the angular positions of the first drive gear 708A and the second drive gear 708B are determined to be the same, or not to be different, the method 1400 may continue by altering, or changing, an angular position of one, or both, the first and second motor drive gears 708A, 708B such that the first drive gear 708A is out of phase with the second drive gear 708B (step 1420).

The method 1400 continues by determining whether the noise generated by the multiple motor gearbox drive unit 700 falls within an acceptable noise intensity threshold (step 1424). The acceptable noise intensity threshold may correspond to a maximum noise intensity level for the multiple motor gearbox drive unit 700. In some embodiments, the maximum noise intensity level may be measured in decibels. If the determined noise output is within the acceptable noise threshold, the method 1400 may end at step 1432. If the determined noise output is determined to fall outside of, or not within, the acceptable noise threshold, the method 1400 may proceed by further tuning the angular positions of the first drive gear 708A relative to the second drive gear 708B to produce a minimum cumulative noise output (step 1428). In some embodiments, this tuning may include altering the angular positions of the drive gears 708A, 708B as described in conjunction with step 1420, altering the position of the engaging drive components as described in conjunction with step 1324 of FIG. 13, and/or altering the drive control signal for one or more motors 716A, 716B of the multiple motor gearbox drive unit 700 as described in conjunction with step 1232 of FIG. 12. The method 1400 may continue until the noise is adequately tuned, and then the method 1400 may end at step 1432.

Although represented by gears in the present disclosure, it should be appreciated that the interconnection between one or more of the rotating elements in the motor gearbox units 500, 600, 700, etc. may include, but is in no way limited to, one or more belts, pulleys, chains, fluid contacting surfaces, linkages, and/or combinations thereof.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein, and other similar standards and protocols not mentioned herein, are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a method for controlling noise in a multiple motor gearbox drive unit, comprising: operating first and second motor drive units of the multiple motor gearbox drive unit at a first time, the multiple motor gearbox drive unit having a first synchronization between engaging drive elements in the first and second motor drive units at the first time; determining, via a processor, a cumulative noise sound wave having a first intensity emitted from the multiple motor gearbox drive unit, wherein the cumulative noise sound wave is a combination of a first noise sound wave generated by the first motor drive unit and a second noise sound wave generated by the second motor drive unit at the first time; determining, via the processor, that the first intensity of the cumulative noise sound wave exceeds a predetermined noise intensity threshold; and sending, via the processor, a control signal to the first motor drive unit changing the first synchronization to a second synchronization between engaging drive elements in the first and second motor drive units, wherein changing to the second synchronization shifts a phase angle of the first noise sound wave relative to the second noise sound wave and changes the first intensity to a lower second intensity within the predetermined noise intensity threshold.

Aspects of the above method further comprise: operating the first and second motor drive units of the multiple motor gearbox drive unit at a second time after the control signal is sent via the processor, the multiple motor gearbox drive unit operating such that both the first and second motor drive units are moving in the second synchronization at the second time. Aspects of the above method include wherein prior to sending the control signal the method further comprises: detecting, via a first motor position sensor, an angular position of a first drive element of the first motor drive unit relative to a reference datum in the multiple motor gearbox drive unit at the first time; and detecting, via a second motor position sensor, an angular position of a second drive element of the second motor drive unit relative to the reference datum in the multiple motor gearbox drive unit at the first time, wherein changing the first synchronization to the second synchronization includes the control signal adjusting the angular position of the first drive element relative to the angular position of the second drive element and the reference datum. Aspects of the above method include wherein the first and second motor position sensors are at least one of a resolver, a rotary encoder, and/or a proximity sensor. Aspects of the above method include wherein the second synchronization is maintained for subsequent operations of the multiple motor gearbox drive unit. Aspects of the above method include wherein the first sound wave and the second sound wave are sinusoidal waves having substantially similar frequencies and/or periods, and wherein the angular position of the first drive element is adjusted via the control signal such that the phase angle of the first noise sound wave is shifted 180 degrees relative to the second noise sound wave. Aspects of the above method include wherein the first and second motor drive units are disposed in a common housing of the multiple motor gearbox drive unit, and wherein the cumulative noise sound wave is emitted from at least a portion of the common housing. Aspects of the above method include wherein determining the cumulative noise sound wave further comprises: receiving, from a sensor disposed adjacent to the common housing of the multiple motor gearbox drive unit, the cumulative noise sound wave emitted from the multiple motor gearbox drive unit. Aspects of the above method include wherein determining the cumulative noise sound wave further comprises: receiving, from a first sensor disposed adjacent to the first motor drive unit, the first noise sound wave generated by the first motor drive unit at the first time; receiving, from a second sensor disposed adjacent to the second motor drive unit, the second noise sound wave generated by the second motor drive unit at the first time; and combining, via the processor, the first noise sound wave and the second noise sound wave into a single combination sound wave. Aspects of the above method include wherein the first intensity of the cumulative noise sound wave and the predetermined noise intensity threshold are measured in decibels.

Embodiments include a method for dynamically tuning transmission elements of a first and second motor drive unit in a multiple motor gearbox drive unit, comprising: receiving, at a processor, a cumulative noise sound wave of the multiple motor gearbox drive unit emitted from the multiple motor gearbox drive unit while operating, the cumulative noise sound wave corresponding to a combination of a first noise sound wave of the first motor drive unit and a second noise sound wave of the second motor drive unit; determining, via the processor, that a noise intensity level of the cumulative noise sound wave exceeds a predetermined noise intensity level threshold; determining, via the processor, an angular position of a first engaging drive element in the first motor drive unit relative to an angular position of a second engaging drive element in the second motor drive unit at a first operation time; and sending, via the processor, a tuning control signal changing the angular position of the first engaging drive element in the first motor drive unit relative to the angular position of the second engaging drive element in the second motor drive unit at a second operation time, wherein the tuning control signal shifts a phase angle of the first noise sound wave relative to the second noise sound wave and changes the noise intensity level to a lower noise intensity level within the predetermined noise intensity level threshold.

Aspects of the above method include wherein the tuning control signal is sent to the multiple motor gearbox drive unit while the first and second motor drive units in the multiple motor gearbox drive unit are both moving. Aspects of the above method include wherein a movement of the first engaging drive element in the first motor drive unit is synchronized with a movement of the second engaging drive element in the second motor drive unit at the first and second operation times. Aspects of the above method further comprise: operating the first and second motor drive units of the multiple motor gearbox drive unit such that both the first and second motor drive units continue to move after the tuning control signal is sent via the processor at the second operation time. Aspects of the above method include wherein the shifted phase angle of the first noise sound wave relative to the second noise sound wave is maintained for subsequent operations of the multiple motor gearbox drive unit. Aspects of the above method include wherein the first sound wave and the second sound wave are substantially sinusoidal waves having substantially similar frequencies and/or periods, and wherein the angular position of the first drive element is adjusted via the tuning control signal such that the phase angle of the first noise sound wave is shifted 180 degrees relative to the second noise sound wave. Aspects of the above method include Aspects of the above method include wherein the first and second motor drive units are disposed in a common housing of the multiple motor gearbox drive unit, and wherein the cumulative noise sound wave is emitted from at least a portion of the common housing. Aspects of the above method include wherein the noise intensity level of the cumulative noise sound wave and the predetermined noise intensity level threshold are measured in decibels.

Embodiments include a multiple motor gearbox drive unit noise control system, comprising: a processor in communication with a sensor, the sensor detecting a cumulative noise sound wave emitted from an operating multiple motor gearbox drive unit, the processor being programmed to: receive the cumulative noise sound wave while the multiple motor gearbox drive unit is operating, the cumulative noise sound wave corresponding to a combination of a first noise sound wave of a first motor drive unit of the multiple motor gearbox drive unit and a second noise sound wave of a second motor drive unit of the multiple motor gearbox drive unit; determine that a noise intensity level of the cumulative noise sound wave exceeds a predetermined noise intensity level threshold; determine an angular position of a first engaging drive element in the first motor drive unit relative to an angular position of a second engaging drive element in the second motor drive unit at a first operation time; and send a motor control signal changing the angular position of the first engaging drive element in the first motor drive unit relative to the angular position of the second engaging drive element in the second motor drive unit at a second operation time, wherein the motor control signal shifts a phase angle of the first noise sound wave relative to the second noise sound wave and changes the noise intensity level to a lower noise intensity level within the predetermined noise intensity level threshold Aspects of the above control system further comprise: the multiple motor gearbox drive unit, wherein the first and second motor drive units are disposed in a common housing of the multiple motor gearbox drive unit, and wherein the cumulative noise sound wave is emitted from at least a portion of the common housing.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A method for controlling noise in a multiple motor gearbox drive unit, comprising:
    operating first and second motor drive units of the multiple motor gearbox drive unit at a first time, the multiple motor gearbox drive unit having a first synchronization between engaging drive elements in the first and second motor drive units at the first time;
    determining, via a processor, a cumulative noise sound wave having a first intensity emitted from the multiple motor gearbox drive unit, wherein the cumulative noise sound wave is a combination of a first noise sound wave generated by the first motor drive unit and a second noise sound wave generated by the second motor drive unit at the first time;
    determining, via the processor, that the first intensity of the cumulative noise sound wave exceeds a predetermined noise intensity threshold; and
    sending, via the processor, a control signal to the first motor drive unit changing the first synchronization to a second synchronization between engaging drive elements in the first and second motor drive units, wherein changing to the second synchronization shifts a phase angle of the first noise sound wave relative to the second noise sound wave and changes the first intensity to a lower second intensity within the predetermined noise intensity threshold.

2. The method of claim 1, further comprising:
    operating the first and second motor drive units of the multiple motor gearbox drive unit at a second time after the control signal is sent via the processor, the multiple motor gearbox drive unit operating such that both the first and second motor drive units are moving in the second synchronization at the second time.

3. The method of claim 2, wherein prior to sending the control signal the method further comprises:
    detecting, via a first motor position sensor, an angular position of a first drive element of the first motor drive unit relative to a reference datum in the multiple motor gearbox drive unit at the first time; and
    detecting, via a second motor position sensor, an angular position of a second drive element of the second motor drive unit relative to the reference datum in the multiple motor gearbox drive unit at the first time, wherein changing the first synchronization to the second synchronization includes the control signal adjusting the angular position of the first drive element relative to the angular position of the second drive element and the reference datum.

4. The method of claim 3, wherein the first and second motor position sensors are at least one of a resolver, a rotary encoder, and/or a proximity sensor.

5. The method of claim 4, wherein the first sound wave and the second sound wave are sinusoidal waves having substantially similar frequencies and/or periods, and wherein the angular position of the first drive element is adjusted via the control signal such that the phase angle of the first noise sound wave is shifted 180 degrees relative to the second noise sound wave.

6. The method of claim 4, wherein the first and second motor drive units are disposed in a common housing of the multiple motor gearbox drive unit, and wherein the cumulative noise sound wave is emitted from at least a portion of the common housing.

7. The method of claim 6, wherein determining the cumulative noise sound wave further comprises:
    receiving, from a sensor disposed adjacent to the common housing of the multiple motor gearbox drive unit, the cumulative noise sound wave emitted from the multiple motor gearbox drive unit.

8. The method of claim 6, wherein determining the cumulative noise sound wave further comprises:
    receiving, from a first sensor disposed adjacent to the first motor drive unit, the first noise sound wave generated by the first motor drive unit at the first time;
    receiving, from a second sensor disposed adjacent to the second motor drive unit, the second noise sound wave generated by the second motor drive unit at the first time; and
    combining, via the processor, the first noise sound wave and the second noise sound wave into a single combination sound wave.

9. The method of claim 8, wherein the first intensity of the cumulative noise sound wave and the predetermined noise intensity threshold are measured in decibels.

10. The method of claim 3, wherein the second synchronization is maintained for subsequent operations of the multiple motor gearbox drive unit.

11. A method for dynamically tuning transmission elements of a first and second motor drive unit in a multiple motor gearbox drive unit, comprising:
    receiving, at a processor, a cumulative noise sound wave of the multiple motor gearbox drive unit emitted from the multiple motor gearbox drive unit while operating, the cumulative noise sound wave corresponding to a combination of a first noise sound wave of the first motor drive unit and a second noise sound wave of the second motor drive unit;
    determining, via the processor, that a noise intensity level of the cumulative noise sound wave exceeds a predetermined noise intensity level threshold;
    determining, via the processor, an angular position of a first engaging drive element in the first motor drive unit relative to an angular position of a second engaging drive element in the second motor drive unit at a first operation time; and
    sending, via the processor, a tuning control signal changing the angular position of the first engaging drive element in the first motor drive unit relative to the angular position of the second engaging drive element in the second motor drive unit at a second operation time, wherein the tuning control signal shifts a phase angle of the first noise sound wave relative to the second noise sound wave and changes the noise intensity level to a lower noise intensity level within the predetermined noise intensity level threshold.

12. The method of claim 11, wherein the tuning control signal is sent to the multiple motor gearbox drive unit while the first and second motor drive units in the multiple motor gearbox drive unit are both moving.

13. The method of claim 12, wherein a movement of the first engaging drive element in the first motor drive unit is synchronized with a movement of the second engaging drive element in the second motor drive unit at the first and second operation times.

14. The method of claim 13, further comprising:
operating the first and second motor drive units of the multiple motor gearbox drive unit such that both the first and second motor drive units continue to move after the tuning control signal is sent via the processor at the second operation time.

15. The method of claim 14, wherein the shifted phase angle of the first noise sound wave relative to the second noise sound wave is maintained for subsequent operations of the multiple motor gearbox drive unit.

16. The method of claim 15, wherein the first sound wave and the second sound wave are substantially sinusoidal waves having substantially similar frequencies and/or periods, and wherein the angular position of the first drive element is adjusted via the tuning control signal such that the phase angle of the first noise sound wave is shifted 180 degrees relative to the second noise sound wave.

17. The method of claim 16, wherein the first and second motor drive units are disposed in a common housing of the multiple motor gearbox drive unit, and wherein the cumulative noise sound wave is emitted from at least a portion of the common housing.

18. The method of claim 17, wherein the noise intensity level of the cumulative noise sound wave and the predetermined noise intensity level threshold are measured in decibels.

19. A multiple motor gearbox drive unit noise control system, comprising:
a processor in communication with a sensor, the sensor detecting a cumulative noise sound wave emitted from an operating multiple motor gearbox drive unit, the processor being programmed to:
receive the cumulative noise sound wave while the multiple motor gearbox drive unit is operating, the cumulative noise sound wave corresponding to a combination of a first noise sound wave of a first motor drive unit of the multiple motor gearbox drive unit and a second noise sound wave of a second motor drive unit of the multiple motor gearbox drive unit;
determine that a noise intensity level of the cumulative noise sound wave exceeds a predetermined noise intensity level threshold;
determine an angular position of a first engaging drive element in the first motor drive unit relative to an angular position of a second engaging drive element in the second motor drive unit at a first operation time; and
send a motor control signal changing the angular position of the first engaging drive element in the first motor drive unit relative to the angular position of the second engaging drive element in the second motor drive unit at a second operation time, wherein the motor control signal shifts a phase angle of the first noise sound wave relative to the second noise sound wave and changes the noise intensity level to a lower noise intensity level within the predetermined noise intensity level threshold.

20. The control system of claim 19, further comprising:
the multiple motor gearbox drive unit, wherein the first and second motor drive units are disposed in a common housing of the multiple motor gearbox drive unit, and wherein the cumulative noise sound wave is emitted from at least a portion of the common housing.

* * * * *